United States Patent
Stevens et al.

(10) Patent No.: US 12,248,782 B2
(45) Date of Patent: Mar. 11, 2025

(54) ACCELERATING PROCESSOR BASED ARTIFICIAL NEURAL NETWORK COMPUTATION

(71) Applicant: Infineon Technologies AG, Neubiberg (DE)

(72) Inventors: Andrew Stevens, Neufinsing (DE); Wolfgang Ecker, Munich (DE); Sebastian Prebeck, Munich (DE)

(73) Assignee: Infineon Technologies AG, Neubiberg (DE)

( * ) Notice: Subject to any disclaimer, the term of this patent is extended or adjusted under 35 U.S.C. 154(b) by 914 days.

(21) Appl. No.: 17/001,977

(22) Filed: Aug. 25, 2020

(65) Prior Publication Data

US 2022/0066776 A1    Mar. 3, 2022

(51) Int. Cl.
| | |
|---|---|
| G06F 9/30 | (2018.01) |
| G06F 9/355 | (2018.01) |
| G06F 9/38 | (2018.01) |
| G06F 12/04 | (2006.01) |
| G06N 3/02 | (2006.01) |

(52) U.S. Cl.
CPC ...... *G06F 9/30036* (2013.01); *G06F 9/30038* (2023.08); *G06F 9/3004* (2013.01); *G06F 9/3552* (2013.01); *G06F 9/3802* (2013.01); *G06F 9/3891* (2013.01); *G06F 12/04* (2013.01); *G06F 2212/401* (2013.01); *G06N 3/02* (2013.01)

(58) Field of Classification Search
None
See application file for complete search history.

(56) References Cited

U.S. PATENT DOCUMENTS

| | | | |
|---|---|---|---|
| 6,351,791 B1* | 2/2002 | Freerksen | G06F 12/0831 711/146 |
| 2018/0189641 A1* | 7/2018 | Boesch | G06N 3/084 |
| 2019/0392287 A1* | 12/2019 | Ovsiannikov | G06N 3/04 |
| 2020/0336272 A1* | 10/2020 | Ovsiannikov | G06F 9/30018 |
| 2021/0256346 A1* | 8/2021 | Desoli | G06F 18/217 |

FOREIGN PATENT DOCUMENTS

| | | | | |
|---|---|---|---|---|
| CN | 111126583 A | * | 5/2020 | G06N 3/063 |

OTHER PUBLICATIONS

Jim Handy. The Cache Memory Book. 1993. Academic Press. 2nd Ed. pp. 118-121.*
William Stallings. Computer Organization and Architecture: Designing for Performance. 2010. Prentice Hall. p. 136.*

(Continued)

*Primary Examiner* — Nathan Sadler
(74) *Attorney, Agent, or Firm* — Eschweiler & Potashnik, LLC

(57) ABSTRACT

An apparatus employed in a processing device comprises a processor configured to process data of a predefined data structure. A memory fetch device is coupled to the processor and is configured to determine addresses of the packed data for the processor. The packed data is stored on a memory device that is coupled to the processor. The memory fetch device is further configured to provide output data based on the addresses of the packed data to the processor, where the output data is configured according to the predefine data structure.

20 Claims, 10 Drawing Sheets

(56) References Cited

OTHER PUBLICATIONS

Rhu et al. "Compressing DMA Engine: Leveraging Activation Sparsity for Training Deep Neural Networks." 2018. IEEE. HPCA 2018. pp. 78-91.*
Cavigelli et al. "EBPC: Extended Bit-Plane Compression for Deep Neural Network Inference and Training Accelerators." Dec. 2019. IEEE. IEEE Journal on Emerging and Selected Topics in Circuits and Systems. vol. 9. pp. 723-734.*
William Stallings. Computer Organization and Architecture: Designing for Performance. 2010. Prentice Hall. pp. 306-307, 646-653.*
Translation of CN-111126583-A. 2023.*
William Stallings. Computer Organization and Architecture: Designing for Performance. 2010. Prentice Hall. pp. 40-42, 66-68, 529-532, and 630-632.*

* cited by examiner

A B C D E F G H
I J K L M N O P
Q R S T U V W X
Y Z A B C D E F

502

A write to J's memory location signifies availability of window A-B-I-J
A write to L's memory location signifies availability of window C-D-K-L
A write to N's memory location signifies availability of window E-F-M-N
A write to P's memory location signifies availability of window G-H-O-P

Fig. 9

Ring-buffer size B is assumed to be 32 words with initial end position 0. The (maximal) kernel footprint word dimensions (W,H) is 2x3.
* Bits corresponding to # logical items to fetch are underlined
** $F(i) = M(i) \wedge (R(i-j)$ if $i >= j$ else 0) for i in [0, # items in packed word]
*** Italics and underline indicate cache hits.

ACCELERATING PROCESSOR BASED ARTIFICIAL NEURAL NETWORK COMPUTATION

FIELD

The present disclosure is in the field of neural networks, and more specifically, increasing processor based neural network computations.

BACKGROUND

In machine learning, a Convolutional Neural Network (CNN, or ConvNet) is a type of feed-forward artificial neural network (ANN) in which the connectivity pattern between its neurons is inspired by the organization of the animal visual cortex. Individual cortical neurons respond to stimuli in a restricted region of space known as the receptive field. The receptive fields of different neurons partially overlap such that they tile the visual field. The response of an individual neuron to stimuli within its receptive field can be approximated mathematically by a convolution operation. Convolutional networks were inspired by biological processes and are variations of multilayer perceptions designed to use minimal amounts of pre-processing. They have wide applications in image and video recognition, recommender systems and natural language processing. The convolutional neural network can also be known as a Shift Invariant or Space Invariant Artificial Neural Network (SIANN), which is named based on its shared weights architecture and translation invariance characteristics.

Sense and control applications can benefit from the application of algorithms employing ANNs. However, the compact digital signal processor (DSP) and microcontroller (uC) designs usable in high-volume cost-sensitive applications have poor performance when executing ANN computations. Such device's limited memories can mean the ANN is implemented using packed/compressed sub-word data. Unfortunately, unpacking such data can cause streaming address-generation, gather, or (re)formatting operations for which the full/aligned word instruction-sets and sequential pipelined microarchitectures of compact uC and DSP systems are poorly suited. As a result, when executing ANN calculations, only a fraction of the processing capacity can be applied to useful payload calculations (such as multiply/accumulate, min/max, etc.). Processing resources (and power/energy) of the compact uC and DSP systems are inefficiently used for unpacking narrow sub-word data using full-word arithmetic/logic operations. This performance bottleneck limits the scope to apply otherwise highly attractive ANN algorithms in sense/control devices employing such compact uCs.

Execution of ANN algorithms on central processing units (CPUs) has been achieved using extended single instruction, multiple data (SIMD) instruction sets including packing/unpacking and scatter/gather memory fetch operations. However, these approaches are not always inapplicable to compact uCs. For example, instruction-level parallelism is required to mask the latency of gather/scatter memory-fetch operations. Area and power constraints of compact uC designs preclude instruction-level parallelism, thereby greatly reducing the potential value of such instruction-set extensions. Further, the frugal load and store microarchitectures typically employed in compact uC designs cannot directly support multiple source and destination instruction formats needed for scatter/gather unpack and pack instructions. Extension to support such operations (e.g., additional register file ports, complex pipeline stall/drain logic, etc.) directly impact critical-path logic elements so that the associated marginal area and power costs can be disproportionately high. Furthermore, the general-purpose SIMD instructions needed to make efficient use of SIMD scatter/gather unpack and pack instructions may not be required. Thus, the effective marginal area and power cost of ANN acceleration would be more strictly associated with hardware for efficient pack and unpack processes.

In addition, loosely coupled accelerator peripherals using streaming direct memory access (DMA) are commonly used to resolve performance issues for specific signal processing applications. However, for ANN acceleration in compact uC systems, the loosely coupled accelerator peripherals are unable to significantly reduce the bottleneck of gathering and unpacking data, and low latency DMA to and from the co-processor(s) is typically not available in compact uC systems. This can significantly reduce an ability to accelerate ANN algorithms in compact uC systems as co-processor resources wait for data gathering and unpacking before completing ANN computations, thereby significantly increasing time to carry out ANN algorithms.

BRIEF DESCRIPTION OF THE DRAWINGS

FIG. 9 illustrates a table that represents various input/output values generated by components of the data fetch unit according to various aspects described.

DETAILED DESCRIPTION

Figure 1:
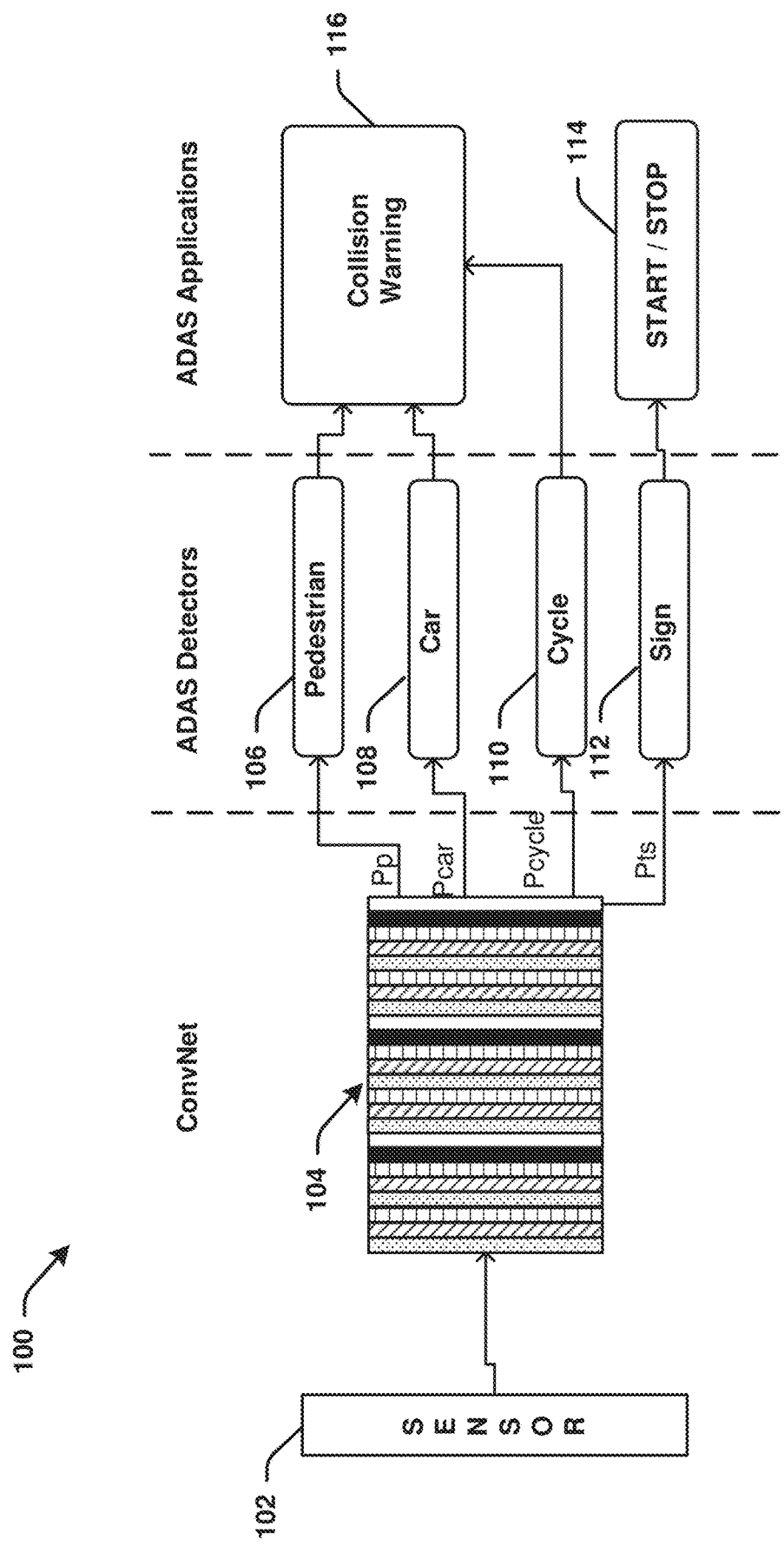
FIG. 1 illustrates a block diagram illustrating a convolutional neural network (CNN) system according to various aspects (embodiments) described.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor, a process running on a processor, a controller, an object, an executable, a program, a storage device, and/or a computer with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

In consideration of the above described deficiencies of compact micro controllers (uCs) carrying out ANN algorithms, various aspects/embodiments enable acceleration of ANN algorithm computations in compact uC systems. The aspects/embodiments serving as solutions of this disclosure increases throughput and power efficiency of ANN algorithms implemented on compact uC systems. The embodiments or aspects described herein accelerate execution of gathering and unpacking data for ANN computations while minimizing the use of CPU or co-processor resources. Therefore, the methods and systems disclosed can increase processing speeds and power efficiency of ANN algorithms implemented on compact uC systems. For example, the data fetch and unpack bottleneck in compact uC systems carrying out ANN algorithms (or similar numerical calculations) may be accelerated through a closely-coupled memory fetch unit that streams output data to a host CPU. The memory fetch unit is closely-coupled to the host CPU and is configured to fetch and unpack data for the host CPU in parallel with the execution of ANN computations on the host CPU. This accelerates the parameter and activation fetch for the inner-loops of sparse sum-of-products/2D/1D sliding-window convolution calculations that comprise a bulk of the computations utilized to execute ANN algorithms.

One or more memory fetch units are each configured to accelerate fetching a stream of inputs required for an ANN calculation from packed or compressed sub-word data whose memory location, layout, and packing format of the input stream is programmable by a host CPU via configuration registers/memory. Gathered and unpacked data from the one or more memory fetch units is written, in format(s) suitable for direct use in CPU arithmetic/logic instructions, to output registers/memory readable by the host CPU. The gathered and unpacked data can subsequently be fetched from the output registers/memory by the host CPU that is configured to complete ANN computations, thereby mitigating a need for the host CPU to unpack, fetch, or format the data and increasing speed of the ANN algorithm. The memory fetch units are further configured to fetch new data-items concurrently with CPU activity, even during a CPU wait state. This further contributes to speedup gains of the ANN algorithm. Additional aspects and details of the disclosure are further described below with reference to figures.

FIG. 1 illustrates an example of a CNN system 100 that can reliably classify images into a certain categories/classes allowing driver assistance systems to take critical decisions such as reduction in engine speed, braking, halting, or other functions involving an automobile, other vehicle or device. An automated navigation system 100 for example can include one or more sensors 102 providing data sets as inputs to a CNN 104 that includes multiple different computational/processing layers with various components. The CNN 104 then provides outputs to one or more ADAS detectors 106-12 (e.g., a pedestrian detector 106, a car detector 108, a bicycle or motorcycle detector 110, a traffic sign detector 112 or other detector) that detects whether a condition is present in relation to a category (pedestrian features, car features, cycle features, traffic sign features, etc.) of data corresponding to any one detector 106-112. Based on whether a given detector determines a condition is present from the output data of the CNN, the detector 106-112 can signal for an application such as a collision warning 116, a braking function to stop/slow, something to start/stop or other application function associated with a function for responding to the condition as part of automated vehicle navigation or the other system/device function, for example.

In one example, the sensor 102 can include an image capturing device such as a camera, radar, light detection and ranging (LIDAR), other image scanning devices, or other sensors for detecting and processing data from images, such as those received on the signals from an image capturing device. The data sets from the sensors 102 can be then provided to the CNN 104 to take the signals and then try to find out what the signals are presenting. For example, a car driving on a highway with front-camera sensor attached could return pictures/images of a traffic sign, if there was any, a lamp post, if there was one, or if there was a car driving ahead, then possibly the pictures of the car would also be returned as part of the sensor data.

Generally, in autonomous driving systems with the driver taking backseat, a lot of the decisions that a human would have taken, such as slowing down, applying the brake, sounding the horn, or other actions are essentially done by the automated navigation/piloting system, with the specialized computer processing components on board, and for them to decide what is to be done next, it is important to understand what is lying ahead of them. As such, a primary objective of the system and the CNN 104 is to determine what is contained in these pictures/images, and then based on what is found in these pictures, implement further decisions.

For example, if analysis of one or more pictures/images indicates a condition/pattern in the images that a human being is present in the middle of the road about 100 meters away, then the on-board computer obviously decelerates and possibly brings the vehicle to a stop accordingly. Alternatively, if a determination is made to accelerate based on the condition within the images, then it would simply direct the vehicle to change lanes, and then accelerate. As such, these decisions, or other decisions can be derived from the nature of the data analyzed within the images as patterns of features that are returned back by the system and then analyzed for any number of given conditions being present in the images or not. The system can be robust with the initial training of filters or kernel filters while learning to detect possible variants to recognize conditions among various circumstances.

CNN 104 can include a series of different computations that can be connected and dependent to one another as CNN computation layers, including various components to provide results of the computations of a given layer to the next layer. These layers can be seen in FIG. 1 as various layers in the CNN 104 block with different shading. At the end of the computation pipe emerges the outputs (e.g., Pp, Pcar, Pcycle, Pts) that can include different probabilities from among the various possible conditions within the image(s) or a sector subset of the image(s). By summing up these probabilities, the values obtained can equal to one (1), for example. The object type or category/class type with the greatest probability then can be the one in which the image or image sector corresponds to, be detected as such by one or more detectors 106-112, and acted upon by one or more of the applications 114 and 116.

For example, if the image contained a pedestrian, the pedestrian ADAS detector 106 can be configured to send a signal to a braking system to apply brakes. Any number of items could be detected within the image by one or more detectors 106-112, not just a pedestrian as an example. Further, in response to a pattern of an object/category type being detected by the convolution neural network system, a signal can be provided that triggers a component to make further decisions based on one or more predefined criteria. For example, the pedestrian detector could send an image message to a collision warning component/system indicating that a pedestrian is being detected. The collision warning system could instantly take cognizance, possibly apply a brake to slow down, slow a vehicle while moving to a direction to the right or left, or another decision based on the pattern recognition of the pedestrian in the image, thereby avoiding a fatal collision. Similar example can be made out of other patterns or conditions being detected within the images from sensor data, such as a car detection, a cycle, a traffic sign, or any other external pattern triggering an action upon being detected.

Figure 2:
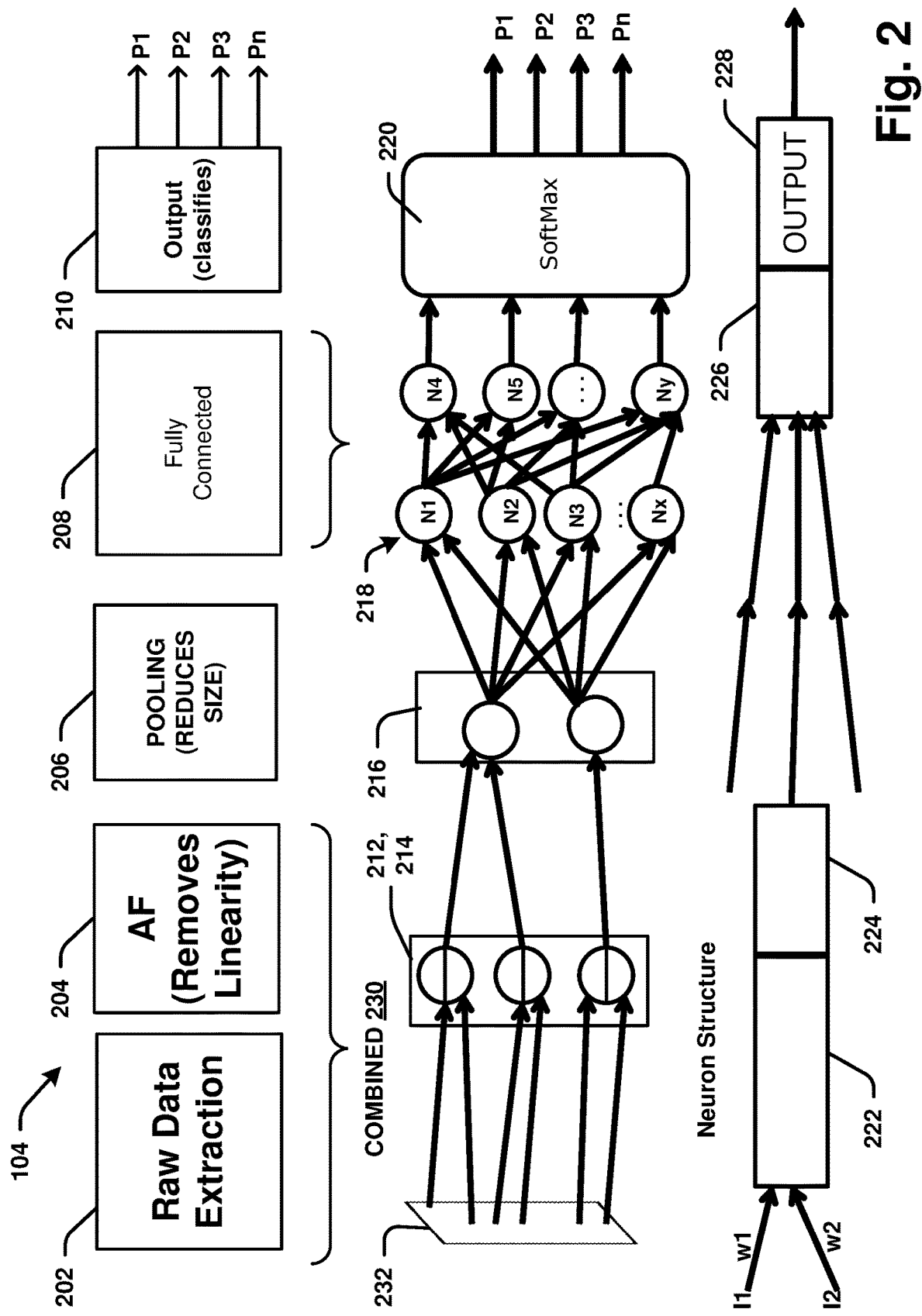
FIG. 2 illustrates a block diagram illustrating a CNN according to various aspects described.

Referring to FIG. 2 is a further example in greater detail of the various computation layers making up the CNN 104, in particular. The CNN 104 can comprise a number of computational layers, including a convolution layer 202, a rectified linear unit (RELU) layer 204, a pooling layer 206, a fully connected (FC) layer 208 (artificial neural network layer), and an output layer 210. Although five computational layers are demonstrated, more or less computational layers can be envisioned as one of ordinary skill in the art could appreciate. A layer, or computation(al) layer, as used herein, can refer to one or more components that operate with similar function by mathematical or other functional means to process received inputs to generate/derive outputs for a next layer with one or more other components for further processing within a convolutional neural network system.

The convolution layer 202, for example, can include one or more convolution components 212 that extract data slices of an image 232 as data sets. The convolution layer 202 can be combined with the rectified linear unit (RELU) layer 204 to also be considered or referred to as one computational layer 230, or, in general, as a convolution layer 230. In particular, convolution operations can be performed by the convolution component 212 to extract features from images being received as inputs from input terminals thereat, such as camera data, radar data, other sensor data or the like. For example, a human face or other feature can be detected from among convolutional data generated by the convolution operations as results outputted by the convolution component 212. The convolution processes can be performed on sets/segments/subsets/portions of the image data, for example, along sections of an image 232 for a particular feature. Initially at first pass, the convolution operations generated by the convolution component 212 can extract low-level features. This can be performed with a sliding window of a particular size (e.g., a window size n×n for a convolution operation, with n being a positive integer, or n×p where n and p are different positive integers as well), in which a sliding convolution is performed with overlapping data from the image 232 in an incremental fashion across the whole of the image 232. Then in subsequent passes or iterations, additional higher-level features can be extracted by combining the results of the previous convolution operations performed for lower-level feature extractions, either by the same component or different ones. The iterations can then continue in order to generate different hierarchical levels of data with one or more different iterations or passes of the image.

For example, a human face can have contours, sloping lines, curves, etc. In one set of convolutional data low-level features (lines, slopes, curves, etc.) can be extracted, for example, to then determine where there is an oval shape in the image, features that look like the edges of an ear, or other features that make up basic structural data for a particular feature/pattern that could be a part of determining whether a certain pattern or conditions exists within the image 232 based on a combination of hierarchical data sets, such as a human on a collision path with the car or other system of components comprising the convolutional neural network, for example.

These convolution operations can result in a feature map. A feature map can be considered the output of one convolution component 212 applied to either image 232 from sensor or output data of a previous layer of operations. A filter instance, for example, is drawn across its receptive field in the output of a previous layer, moved one pixel or more at a time. A receptive field can be referred to as a small area/subset area of an image connected to a filter (filter kernel). For example, a filter can analyze for a presence of a triangle as a feature. Instead of one filter sliding across a complete image looking for existence of triangle(s), various filters can analyze/govern various areas of the image for triangle(s) or other particular feature, for example.

Convolution at each position of the filter in its receptive field can result in yielding a measure of presence of the feature represented by the kernel at that position. The measure of the presence of a feature at all convolution positions can be the feature map of the filter kernel. For example, if a convolution filter is slid one pixel at a time, then the new convolution field can overlap with the previous convolution field by (field width−1) input values. For example, in a 32×32 image, dragging the 5×5 convolution kernel across the input image data with a stride width of one pixel results in a feature map of size 28×28 (32−5+1×32−5+1) output per convolution filter. The terms "convolution kernel", "convolution filter kernel", "filter", "kernel" and "filter kernel" can be used interchangeably herein, in which additional details are provided below (e.g., with reference to FIG. 3). Also as used herein, a stride width or length can define how much a sliding window shifts or how a filter convolves around a volume of input data.

After extracting the lowest level of information as low-level features, the outputs can be combined by the convolution components 212 of the convolution layer 202 as convolution information or convolution data sets, such as by combining two edges/lines and analyzing whether the combination corresponds to a nose, or if it corresponds to an eye, for example, with a detector 106-112. The combinations of these low-level features (e.g., edges, lines, etc.) can also form data sets corresponding to slightly standard features (e.g., a medium hierarchy level) related to a condition in the image 232 such as for a human face, nose, ears, eyes, forehead, facial hair, and so on, in a hierarchy of convolutional data sets, each set comprising a greater complexity of extracted data features. Further, the data sets can be combined in a progression along a feature map of the images and further process along the computational layers until the system is able to discern high level features, and determine a complete human face as an object/high-level feature within the images, for example.

In this manner, low-level features (e.g., a curve, an edge, a line, slope, etc.) can be one level of data set hierarchy, and another level of convolutional data sets (e.g., a shape, a combination of patterns, etc.) can form another hierarchy level, while any number of convolutional data sets can be generated from convolutional operations in a hierarchy of data sets to determine higher levels of patterns, including a face, a human, an animal, a bicycle, motorcycle, sign, details of a sign, or any number of conditions (e.g., a human in a collision path, an animal crossing into collision path, or other situation occurring in one or more images).

Because convolution operations can be linear, the convolution layer 202 does not completely and always reflect what could be considered the real world behavior, which does not typically follow a fixed path and is usually random. Thus, to generate the output of convolution with more randomness, the RELU layer 204 can be configured into the CNN system/component 104, and further combined as part of the combined convolution layer 230. The convolution components 212 can be connected to RELU components 214 of the RELU layer. The RELU components 214 can be configured to generate sets of non-linear convolution output data by removing linearity from the convolution data outputted from the convolution components 212 to RELU inputs. The RELU components 214, for example, can monitor inputs for negative values that can occasionally be contained in the output of convolution. Then, based on the convolutional data sets received as these inputs generate a similar hierarchy of data sets as the non-linear convolution output data. In response to detecting any negative values, the RELU components 214 replaces them with either a zero or a positive value. In this way, the linear output of the convolution layer 202 can be transformed into at least slightly or marginally nonlinear data as nonlinear convolutional output data.

With the features extracted and linearity removed, the pooling layer 206 at pooling components 216 receive the nonlinear convolutional output data to make it scale invariant. Thus, regardless of the position, the illumination, the impurity of the image being analyzed, the CNN system can be intelligent and robust to be able to detect a variant of the same picture/image.

Thus, the convolution layers 202 can generate feature extraction. RELU layers 204 remove linearity from data to make them consistent with real-world data. The pooling layers 206 are responsible for volume reduction and render the network image scale invariant, which can be similar to or compared with other image processing techniques such as scale invariant feature transform (SIFT) and histogram of oriented gradients (HoG).

The pooling components 216 are configured to generate pooling outputs via a pipelining process in parallel with the convolution combined layer 230. In an embodiment, pooling components 216 can initiate processing for scaled invariants and perform statistical operations on the first set/subset of convolutional data or the nonlinear convolutional output data. As such, the two different computational layers can be pipelined and operated in parallel with the functions of one another, or process concurrently as the sliding convolution window outputs a portion or some of the entirety of convolution data across an image 232, for example. The convolution/RELU operations of the convolution layer 230, the convolution components 212 or RELU components 214 operate as pipelined processes with the pooling components 216. These pooling components 216 perform statistical operations on the non-linear convolution output data based on a pooling window for a subset of the non-linear convolution output data.

For example, pooling operations reduce the size of the input data (non-linear convolution output data) provided by the RELU layer 204. As each subset of data is received, a single set of nonlinear convolutional output data can be processed, reduced in size at the pooling layer 206, and then subjected to classification at a fully connected (FC) layer 208 and eventually converted to human understandable form by a classifier 210, further detailed below.

The FC network layer 208 of the artificial neural network (ANN) represents the functioning of the human brain with neurons. For example, different values (e.g., 1, 5, 60,000 and a 0.25, or other sets of values) can appear at the inputs of the ANN to enable the determination of a pattern or a condition present in the image data (e.g., a man, a woman, a human being, etc.). If the FC components see a different set of numbers, then the system output will be detected that it is possibly something else.

The output of pooling components 216 of the pooling layer 206 can be fed to the artificial neural network, also known as the FC layer 208, which further determines the most likely candidate that the picture/image is containing. As such, these numbers as outputs of the FC components can then be converted into probabilities by what is known as the output layer 210 and fed to various detectors (e.g., 106-112 of FIG. 1) like the pedestrian detector 106 or traffic sign detector 112 and necessary actions are taken in response at the applications 114 or 116, for example.

The FC components 218 form the ANN with a neuron structure formed by net functions 222, 226 and output functions 224, 228 according to respective first FC layer (FC1) and second (succeeding) FC layer (FC2). The outputs of each neuron N1-Nx and N4-Ny can be dependent on the availability of input data (e.g., I1, I2) and input weights (e.g., w1, w2), instead of a program counter and outside instructions being fetched. This means that each FC component 218 can include one or more data flow processers that operate without fetching an instruction from a memory, but, instead, process in response to an availability of input data at one or more inputs (e.g., I1, I2) in order to immediately/instantaneously process the input data by performing a designation function. The inputs (e.g., I1, I2) can be provided by the pooling outputs of the pooling components 216 or a preceding FC component/layer (e.g., FC 1, N1-Nx) of data being available at FC2 component inputs (e.g., I1, I2).

Data flow processing can be in contrast to, or different from Von Neumann control flow processing/Von Neumann machines/processors that fetch instructions from memory with a program counter in order to process data, rather than process data based on an availability of certain data at an input alone, for example. The FC components 218 can also each individually receive the same plurality of inputs (e.g., I1, I2) at each FC component within a layer (e.g., FC1). For example, N1-Nx all receive an input from each pooling component 216, in which these inputs (e.g., I1, I2) can be the same. Additionally, each second (or succeeding) layer (e.g., FC2, N4-Ny) of FC components likewise can each receive the same inputs (e.g., I1, I2) from the preceding layer of components (e.g., FC 1, N1-Nx, preceding computation layer, or other computation layer) as well, for example, and so on throughout various FC layers 208 (e.g., FC 1, FC 2, etc.), which can be one or more different layers of computational components forming the ANN.

Further, each net function of neurons or FC components 218 of the FC layer 208 can comprise a mathematical operation, such as a dot product of the inputs and weighting by weights (as a weight factored to each input). The inputs (e.g., I1, I2) can be the same and the weights (e.g., w1, w2) vary. Further, a sum of the dot products of the inputs (I1, I2) and weights (e.g., w1, w2) of each input (I1, I2) can also be performed at each FC component. Different FC components 218 can have different weights (e.g., w1, w2), or, alternatively, different inputs (I1, I2) can have different weights (e.g., w1, w2) differently for each FC component 218 receiving the same group/set/plurality of inputs (e.g., I1, I2). Alternatively, these weights can be similar or different from one another, such that at least some FC components 218 could have the same weights (e.g., w1, w2) at the inputs, while other FC components 218 have different weights (e.g., w1, w2) from one another with different values giving weight to or any amount for factoring/considering a corresponding input in processing.

In addition, the output neuron 224, 228 of each FC component 218 can also comprise a mathematical function operating on the results of the net function 222, 226. For example, the output function can comprise a trigonometric function (e.g., tanh, tan, etc.) or other mathematical function that is performed on the weighted inputs and the result of a sum or other operation performed thereon.

Finally, the output layer 210 can include a classifier function 220 that received FC layer outputs or ANN outputs. These classifier functions could include a Soft Max function, for example, whose function could be to squash/compress the outputs of FC layer 208 to values ranging from 0 through 1. The outputs of classifier functions 220 can comprise probabilities, in which the most likely output class corresponding to the input data has the highest probability. The output layer 210 could also be a standard classifier like a support vector machine (SVM), or other classifier, for example.

In embodiments of the disclosure, the execution of the convolution 230 and the pooling layers 206 can be pipelined (via execution pipelining or pipeline processing) leading to significant speedup and efficiency. As discussed above, the pooling layer 208 can operate in parallel with or concurrent to the convolution layer 230 based on the availability of data from a first convolution sliding window operation, and begin processes at the same time or during subsequent sliding window operations being performed on overlapping or subsequent subsets of image data.

Execution pipelining or pipeline processing can be referred to herein as a set of data processing elements, components or functions connected in series, where the output of one component or element is the input of the next one. The elements or components of a pipeline can be executed in parallel or in time-sliced fashion; in that case, some amount of buffer storage can be inserted between elements. Instead of waiting for a previous or preceding component to completely finish operating on a set of input data, the subsequent or succeeding component or element can begin processing immediately on a partial or incomplete set of results from the previous/preceding element or components, for example. In this manner the components of the pooling layer can be configured, for example, to operate on at least partial results from the convolution combined layer 230 as one speed-up.

In other embodiments, the FC layer 208 execution can also be pipelined, and thus, contributing to additional speedup and efficiency. Further, the FC components 218 as neurons can also be pipelined to begin processing in response to partial output data from the previous or preceding FC component 218 in order to function in parallel with one another. For example, the net function 222 of a neuron (e.g., N2) of FC1 can begin processing before the output function 224 of a preceding FC component (e.g. N1) is completed, and in parallel with the processing operations of the output function 224 of the preceding FC component (e.g., N1) of FC 1. Subsequently, FC components can likewise operate in parallel to one another via such pipeline processing operations.

Figure 3:
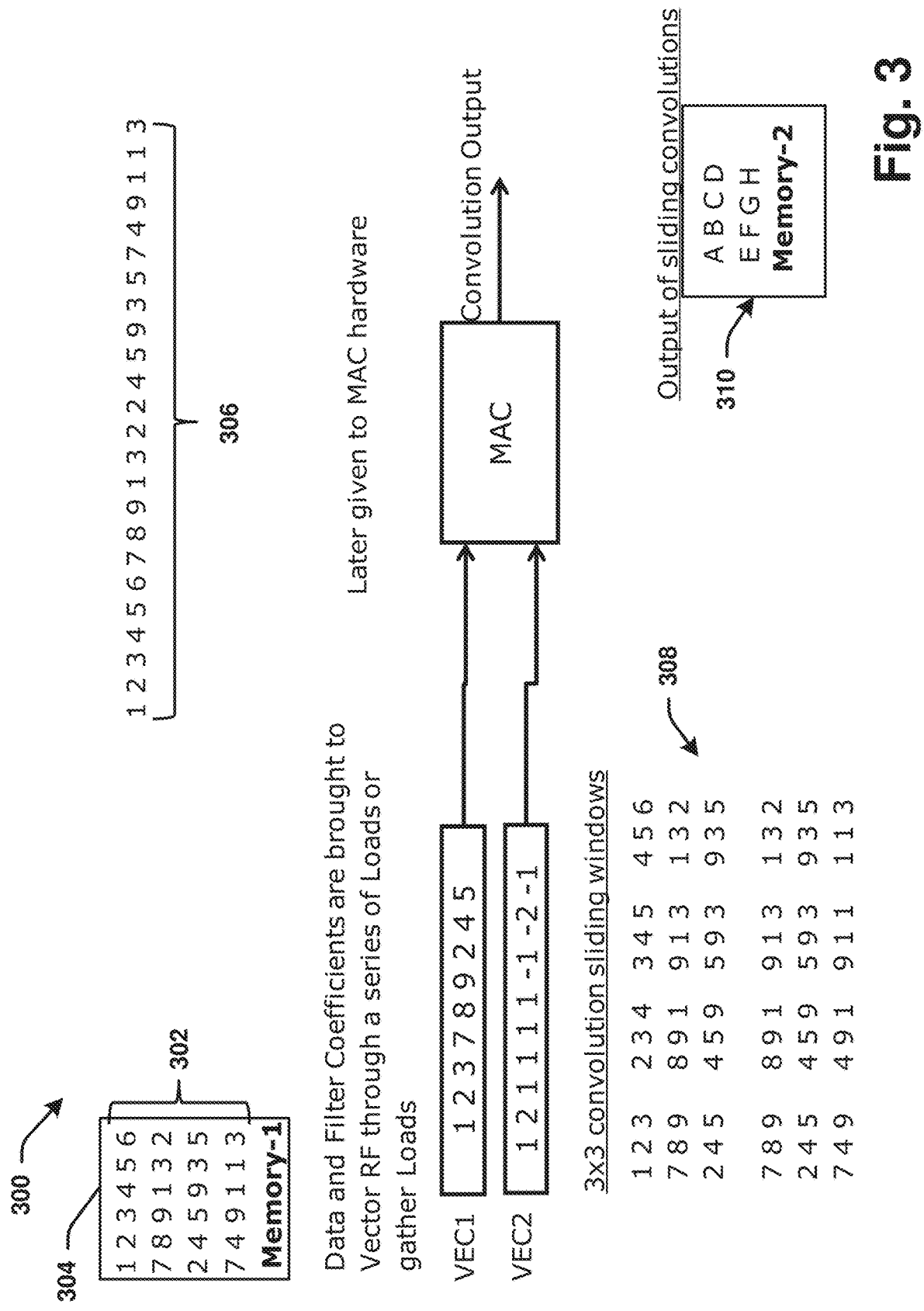
FIG. 3 illustrates a diagram of aspects of convolution operations and some related components according to various aspects described.

Referring to FIG. 3, illustrated is an example of representative convolution data results 300 in accordance with various aspects/embodiments herein. Convolution operations can be utilized by convolution components 212 of a convolution layer 202 or as a combined convolution layer 230 with RELU components 214 as described above with reference to FIG. 2. Convolution components 212 of the convolution layer 230 can be configured to generate weighted multiplications and summations, for example. In terms of signal processing, these operations can be single dimensional, and in the case of image processing, the convolution operations can be two-dimensional such that there can be various weights along an X axis and a Y axis that weigh the inputs differently or similarly by an amount for which each is to be factored or considered in further processing.

In one example, a two dimensional array of numbers 302 can be stored in a memory, represented by memory 304 (memory-1). These values can be representative of an area of data or annotated values provided as inputs to one or more convolution components 212 by sensors (e.g., image/camera/video capturing sensors or the like). These values 302, for example can correspond to an image or a subsection/subset of image data, and are representative here for illustrative purposes of potential values for convolution operations by the convolution components or components of the combined layer 230. These values could be real, imaginary, a function of one or more variables, or other representations of data being received or stored in memory 304, for example. The data 306 can be similar to the data 302, but represented slightly differently, demonstrating the linear storage of data as it is being provided by the sensor(s) 102 to be stored in memory 304, for example.

Convolution is a mathematical operation in which a filter kernel can be slid across an image with the aim of detecting in it the presence of the feature represented by the filter kernel. In CNN systems, a filter kernel can have a fixed area in the image 302 to search for its feature. Hence, multiple instances of a filter can be connected to non-overlapping regions of the image known as local receptive fields. Each of the filter instance searches for the same exact feature but only in its local receptive field in Memory 304. It is thus stated that for every feature which must be searched for, a corresponding set of filter kernel instances connected to locally receptive fields are provisioned. The convolution output of all filter kernel instances of a feature represents the feature map of the feature. Plurality of filter kernels is extended to other features intended to be detected.

A representation of the nose, for example, or a picture of the nose in a particular filter kernel, can be placed on top of the image (captured by sensor data) at a certain location or subset, used to multiply the numbers that are beneath the filter kernel and a sum of the results of the multiplication can be performed by the convolution component 212 to obtain a certain value that is then stored. The kernel can then be slid in a direction (e.g., to the right) by one column. The calculations are then repeated, where the calculations can be repeated with given mathematical operations such as a dot product multiplication and a sum to obtain a result to be stored.

These sliding operations can continue along the x-axis and upon reaching the end of the x-axis along a certain row. The kernel can be brought back to the first column, but slid down by a row from where the convolution component 212 repeats the operations again. Overlapping image regions 308 of image 302 represent convolution windows. It is on and along these convolution windows 308 that convolutions are performed by convolution components 212. On a data parallel processor (e.g. SIMD processor), the data belonging to a convolution window and data belonging to a filter kernel can both be loaded into vector registers and fed to a vector multiply-accumulate (MAC) unit. One vector MAC operation can produce one convolution output, for example. This convolution output can then later be stored in Memory 2 (memory 310). After the filter kernel completes convolutions with all of the overlapping convolution windows 308, complete convolution output can then be available in convolution output memory 310.

From the convolution processes, hierarchical data sets can be generated in parallel or concurrent to one another according to aspects herein, and afterwards made non-linear by the RELU components 214, in order to determine whether an image contains a picture of a nose and the location within an image. If this determination is affirmative, then those portions of the image that contain the picture of a nose would tend to output higher convolution values relative to other portions of the image.

In one example, under a 3×3 (or other n×n size or n×p size, with n and p being a positive integer that can be the same or different) convolution sliding window 308, a set of smaller numbers (e.g., 1, 2, 3, 7, 8, 9, 2, 4, 5) can be derived, and then immediately another sequence (e.g., 2, 3, 4, 8, 9, 1, 4, 5, 9) cam be generated. These are representative values that could represent values taken from or derived from an image. The sequence of numbers (e.g., 1, 2, 3, 7, 8, 9, 2, 4, 5) can be from an initial area/subset of numbers as convolution sliding window data. By then ignoring the first column and focusing on the numbers starting on the second, third and fourth columns, on the first, second, and third rows another sequence (e.g., 2, 3, 4, 8, 9, 1, 4, 5, 9) could be obtained.

Further utilizing the 3×3 window 308, small sized image data portions that are size 3×3 as an example can be analyzed from the image data stored in memory 304. Other sized windows can also be utilized and the example size is not necessarily exhaustive or limiting to all aspects herein. Sliding the window over by another column, the window results can be 3, 4, 5, 9, 1, 3, 5, 9, 3, forming another sliding window result. A dot product multiplication operation can then obtain each number as the output of sliding window convolutions, which can be represented on the bottom right-hand corner annotated by memory-2 (e.g., 310) as A B C D E F G H. For example, a value or representative result (e.g., A) can basically represent the output of the convolution of a filter kernel with the first window (containing 1, 2, 3, 7, 8, 9, 2, 4, 5, and B representative of the output of convolution of the kernel representing nose (or other feature) with second window containing 2, 3, 4, 8, 9, 1, 4, 5, 9, and so on, where similarly H is the convolution of the filter kernel representing nose (or other feature) with the last window, 1, 3, 2, 9, 3, 5, 1, 1, 3, for example.

A, B, C, D, E, F, G, and H can in various ways indicate a level of an availability of a nose in any one region/subset/area of the data from which the given letter symbol corresponds, or as one level of hierarchical data. For example, if A was a very high value, then there is a high chance that a nose (or other feature corresponding to a kernel or sliding convolution window of the data sets) could be located in this position. As such, convolution can provide a real estimate of whether and where a certain feature is likely to be available in image data. Similarly, other features or any number of features can be analyzed by the convolution components 212 respectively and the combined computation layer 230 for the detection of one or more patterns or conditions within one or more images, which can be called feature detections; the output of which can be illustrated by the convolution outputs 310, for example.

Figure 4:
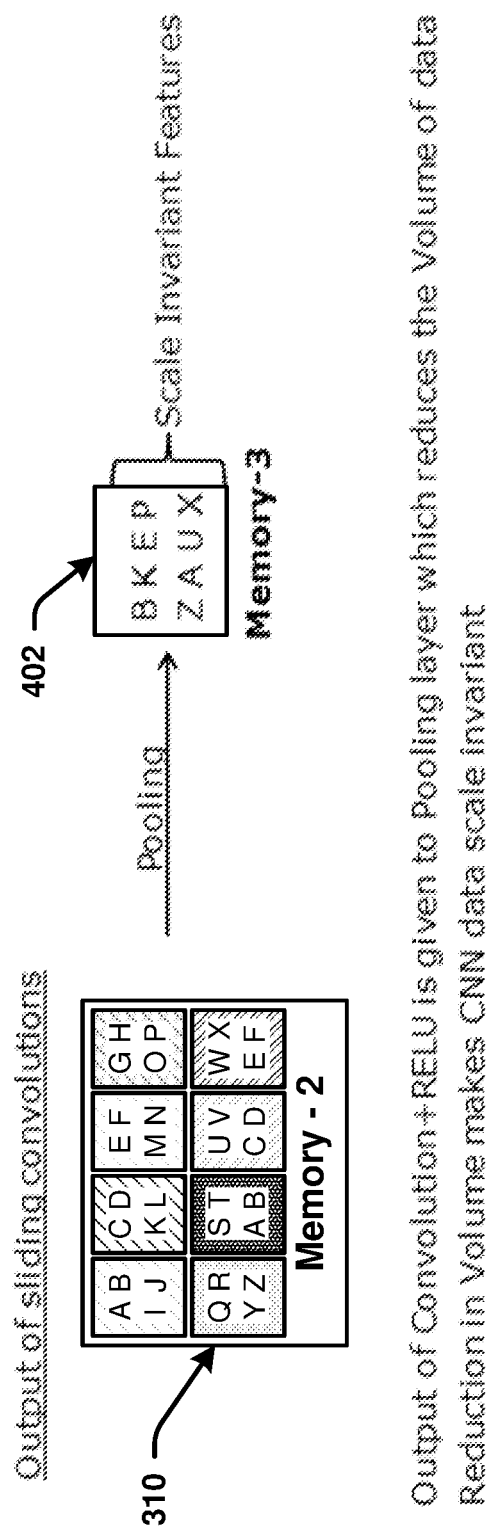
FIG. 4 illustrates a diagram of aspects of pooling operations according to various aspects described.

Referring to FIG. 4, illustrated is a further example of pooling operations of the CNN system 100. The outputs of convolution 310 are further expanded here with memory-2, including the alphabet, with letters being representative of any value or function from a larger image, for example. The pooling components 216 of pooling layer 206 processes the convolution outputs 310 by processing the data by a pruning, trimming, or compression process that reduces the output of convolution 310.

For example, a set of non-overlapping blocks can be represented in different shades or blocks delineated in Memory-2 (memory 310). For example, the block A, B, I, J is different from block/window C, D, K, L, which is different from the block E, F, M, N and the block G, H, O, P, and so on. As such, the pooling components 216 of FIG. 2 can process the output of convolution and sector non-overlapping regions 2×2, which is two along the X axis and two along the y-axis in each of these 2×2 cells by performing a statistical operation to achieve the pooling outputs 402 to be stored in memory-3, for example. These pooling outputs 402 represent scaled invariant features.

Although a non-overlapping region of 2×2 is illustrated and described herein as an example, other sizes could also be envisioned and utilized so that a p×n non-overlapping block/window can be used, where p or n can be any positive integer other than zero, vary from one another or be the same, for example.

The statistical operation performed by the pooling components 216 can comprise a minimum, a maximum, an average, a median, or other statistical operation (e.g., of A, B, I, J) of a window of the sliding convolutions. The pooling components 216 could perform pooling operations of any statistical operation, but in most implementations the statistical operation used by the pooling components can be a maximum.

As such, from each of these 2×2 block windows (or other size of blocks/windows) on the output of sliding convolutions 310, a value can be selected (e.g., the representative B). In this example, B has been chosen, K has been chosen from the next block, followed by E, P and Z, A, U, X, as stored in Memory-3 402 and comprising the pooling outputs as scaled invariant features or as a volume reduced outputs derived from the convolution outputs 310 from the convolution components 212 or sets of nonlinear convolution output data from the RELU components 214. The pooling components 216 can thus generate a reduction in the data size from the inputs it receives as a pooling operation. The output of the pooling operations can then be input to the artificial neural network or the FC layer 208, which further tries to make determinations on the patterns/conditions within the images for further decisions to be made.

In various aspects, particular component hardware can be assigned to perform these computations so that all a main processor (e.g., an engine control unit, or other main processing component) has to do is to tell the convolutional neural network component hardware the following: i) there is an image to be analyzed, and ii) after determining what the image is, provide an indication of the results. As such, computations of the various layers of the CNN 104 can be offloaded to a CNN accelerator, for example, to perform the computations in the background to the results back to the main processor. While this can be a good solution for power and performance efficiency, it can come at a cost because such a hardware unit can occupy a significant area on microcontrollers as well as consume a significant amount of power for functionality. Thus, aspects herein can also enable elimination of the need for a dedicated hardware accelerator and instead reuse certain infrastructure on the chip by using certain one or more smaller lightweight components, not as intensive as a dedicated CNN accelerator. As such, cost can be reduced as well as performance be maintained without overloading the main processor.

In an embodiment, the pooling processors 216 can operate via pipelining operations by operating in parallel with the convolution components 212, or with the combined convolution+RELU layer 230 and associated processes. Instead of each layer of the CNN 104 initiating into action only after the preceding layer has finished all computation operations (e.g., all outputs of sliding convolution 310 are generated either for a certain hierarchy of features or an iteration over an entire image of subset image portions), the pooling components 216 can initiate pooling operation on a pooling window as soon as such a window has been produced by its predecessor (e.g. convolution components 212) as against typically waiting for all of the pooling windows to be produced by its predecessor.

For example, as a trigger event (e.g., referred to also as an access match or observation(al) unit output), a block of data can be available at inputs for processing to the next layer, and thus, the next layer immediately start computation. As such, processing gain can be increased by starting the pooling operation as soon as the convolution layer 202/212 has computed one block/window of computation outputs (e.g., one of the shaded block A, B, I, J).

Rather than waiting for the convolution layer to generate the convolution outputs A, B, C, D, E, F, G, etc., all the way to F in the bottom right hand corner of outputs 310 of memory-2 to initiate pooling of the outputs, the pooling components 216 can process in response to a trigger event or indication (or access match) based on data availability. For example, a trigger event can be the writing to a location in the memory-2 that corresponds to the last value for the given window (e.g., J for the first shaded block of the 2×2 window). As such, as soon as an element, value or any factor of a 2×2 block is written to a memory or a particular memory location, a first pooling component 216 can be triggered to immediately begin processing pooling operations on the data available.

In another embodiment/aspect, a trigger indication in this example can additionally or alternatively be an availability of an output of sliding convolution that corresponds to a last value, a position or a result of a p×p window (e.g., 2×2 non-overlapping data block), where p can be any positive integer. Further, this trigger can extend to include an availability of data at all inputs corresponding to various input data, so that once all inputs receive a datum, as with a dataflow processing flow, regardless of whether the reception of data itself is complete/ended, or the previous layer (e.g., combined layer 230, a convolution component 212, a RELU component 214, or the like) is complete, processing in the next layer can be triggered (e.g., via a pooling component 216).

Figure 5:
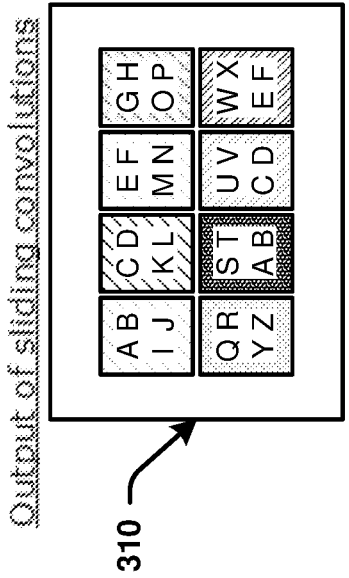
FIG. 5 illustrates another diagram of aspects of convolution and pooling operations according to various aspects described.

In response to the availability of a value or an indication of a writing operation at a particular position, a pooling operation on a completed block or non-overlapping window (e.g., a 2×2 window of nonlinear convolution output data or output of sliding convolutions 310) can be initiated by a pooling component 216. The pooling component 216 can perform operations simultaneously alongside, or in parallel with, one or more convolution components 212. Referring to FIG. 5, while convolution components 212 provide sliding convolution outputs 310, the pooling components 216 can provide final pooling outputs with output addresses 502 for each block (e.g., 8 blocks J, L, N, P, Z, B, D and F). Thus, for example, as soon as J is available from a convolution component 216, the maximum of A, B, I, J can be found as an example statistical operation as part of a pooling operation of a pooling component 216, without waiting for other results such as C, D, E, F, etc. from other windows or subsets of data in the image within the same hierarchy or different hierarchical level of data. Further, as soon as N is available, the pooling operation of E, F, M, N can start without waiting for O to be written to memory. Likewise, as soon as P is available, the pooling computation for G, H, O, P can initiate, and so on for each block of output sliding convolution data or also referred to as non-linear output data 310, for example.

Figure 6:
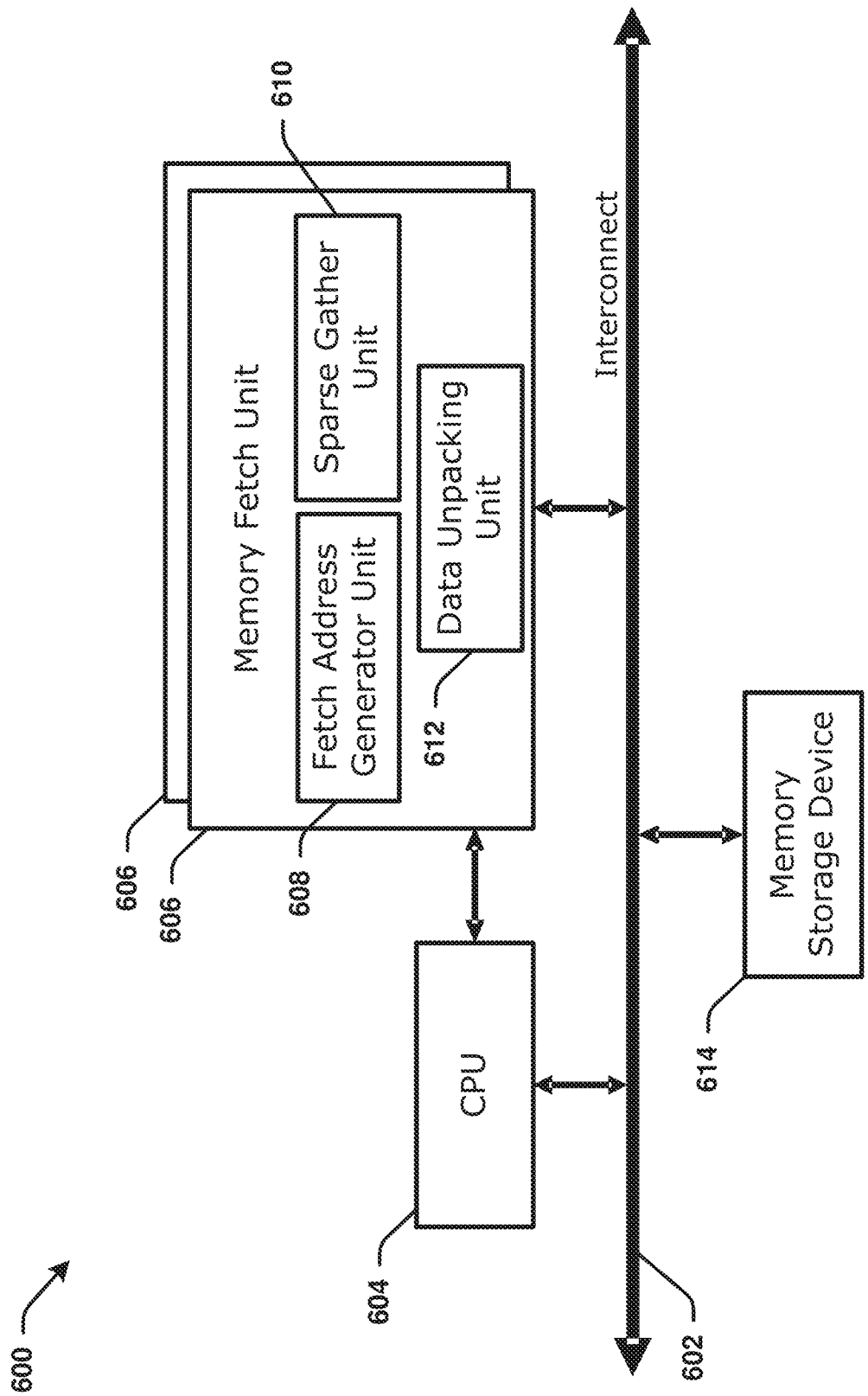
FIG. 6 is a block diagram illustrating one or more data fetch units closely coupled to a CPU according to various aspects described.

Referring to FIG. 6, illustrated is an example of an architectural ANN system or device 600 for operating the CNN layers in accordance with various aspects or embodiments. The system 600 includes a central processing unit (CPU) 604, one or more memory fetch units 606, and a memory storage device 614 coupled to one another via a processor interconnect 602. In an aspect, the CPU 604 may be configured as a microcontroller unit (uC), a compact uC, or a digital signal processing (DSP) device with sequential pipelined microarchitectures. For example, the CPU 604 may be configured as a compact uC having an in-order, simply pipelined/single-issue microarchitecture.

The CPU 604 is configured to facilitate control and operation of the components of the system 600, and is directly coupled to the memory storage device 614 and the one or more the memory fetch units 606. Further, the CPU 604 is configured to process data of a predefined data structure. The predefined data structure is defined by the CPU 604 and is stored in configuration registers/memory (not shown) that are coupled to the CPU 604. Further, the memory storage device 614 is configured to store packed/compressed data of another predefined data structure. The another predefined data structure of the packed/compressed data stored on the memory storage device 614 may, for example, be different than the predefined data structure of the data that the CPU 604 is configured to process. In an embodiment, the packed/compressed data may correspond to data sets (e.g., images, video data, waveform data, etc.) collected by sensors 102 that may be provided as inputs for the CNN 104. The packed/compressed data may comprise packed sub-word data whose memory location, layout, and packing format is programmable by the CPU 604 via the configuration registers/memory. Thus, the CPU 604 may facilitate storage of the packed/compressed data on the memory storage device 614 from the data sets collected by the sensors 102.

In some embodiments, the packed/compressed data comprises stored elements (i.e., stored data or referred to as essential data), that are stored in the memory storage device 614, and generated elements (i.e., generated data or referred to as nonessential data) that are implicit in the specified packing format of the packed/compressed data. The generated elements can comprise padding data (i.e., padding at the margins) or skipped elements in spare data, for example.

In an embodiment, the memory fetch units 606 and the CPU 604 can operate to support or comprise the convolution components 212 of the convolution layer 202, the pooling components 216 of the pooling layer 206, or the FC components of the FC layer 208 for pipeline processing. For example, the CPU 604 comprises arithmetic/logic instructions that are configured to perform processes (e.g., multiply/accumulate calculations, minimum/maximum calculations, or the like) associated with the convolution components 212, the pooling components 216, or the FC components, and the memory fetch units 606 are configured to provide output data suitable for processing to the CPU 604 for the aforementioned processes. In a further embodiment, the memory fetch units 606 can each be referred to as a memory fetch device.

Each memory fetch unit 606 is configured to determine addresses of packed/compressed data in the memory storage device 614, and provide the corresponding output data to the CPU 604 based on the addresses of the packed/compressed data and the predefined data structure. In an embodiment, the memory fetch unit 606 generates the output data such that the output data is configured according to the predefined data structure. Thus, the memory fetch unit 606 may unpack the packed/compressed data and may decompress or (re) format the subsequently unpacked data in a manner suitable for processing by the sequential pipeline microarchitecture of the CPU 604. This mitigates or eliminates a need for the CPU 604 to unpack or reformat the packed/compressed data, thereby freeing computation power that may be used instead to perform arithmetic/logic operations on the output data. This mitigates the performance bottleneck of unpacking and reformatting packed data, and increases speedup gains of completing an ANN algorithm on the CPU 604.

In another embodiment, the stored data of the packed/compressed data comprises one or more redundant memory words, where the memory fetch units 606 may each comprise a buffer (e.g., a circular buffer) configured to store the one or more redundant memory words. The memory fetch unit 606 is configured to selectively fetch the stored data based on the redundant memory words stored in the buffer. In an aspect, the memory fetch unit 606 is configured to selectively fetch the redundant memory words of the stored data a single time from the memory device.

The memory fetch units 606 may, for example, each comprise one or more co-processors configured to carry out the functions/processes of the memory fetch units 606. Components of the memory fetch units 606 are closely-coupled to the CPU 604 or the memory storage device 614, where the memory storage device 614 includes an instruction memory and a data memory. For example, the memory fetch units 606 may be attached as core-attached co-processors directly coupled to the CPU 604, where the CPU 604 comprises special-function instructions, special-function registers (e.g., IFR in RISC-V), local memories, bus agents, and the like that the memory fetch units 606 may directly access or directly share resources with. Further, the CPU 604 may comprise an instruction fetch device configured to fetch data (e.g., instruction data stored at instruction memory) from the memory storage device 614. In an embodiment, the memory fetch units 606 are each configured to share resources with the instruction fetch device of the CPU 604, and may be configured to fetch the packed/compressed data at least partially from the instruction memory of the memory storage device 614. By virtue of the memory fetch units 606 sharing resources with components of the CPU 604, the memory fetch units 606 may each access memory via a CPU/co-processor memory interface that enables the use of high-performance CPU memory ports (e.g., dedicated program memories, dedicated instruction memory, or scratchpad data memories). This further mitigates the performance bottleneck of gathering and unpacking data, thereby further increasing speedup gains of completing an ANN algorithm on the CPU 604. Thus, in an embodiment, the memory fetch units 606 access or perform memory fetch operations on the memory storage device 614 through the CPU 604 (e.g., the memory fetch units 606 access memory through the CPU 606 via a co-processor interface). In another embodiment, the memory fetch units 606 may each be configured as a memory management unit (MMU) with settings configured by MMU special function registers (SFRs), where output data that were unpacked/gathered by the MMU is mapped to virtual addresses by the MMU. Further, the memory fetch units 606 may each be configured to share or comprise MMU resources (such as caches, bus agents, high-bandwidth CPU interface(s), or the like). In yet another embodiment, the memory fetch units 606 may be coupled to a bus of the CPU 604 as a peripheral using streaming direct memory access (DMA), where the memory fetch units 606 may fetch data from the memory storage device 614 by DMA read and comprises programmable input/outs (I/Os). In yet another embodiment, the memory fetch units 606 are integrated within the CPU 604, i.e., the memory fetch units 606 are part of the CPU 604.

In an embodiment, the CPU 604 comprises an arithmetic logic unit (ALU) configured to perform ALU processes. In such embodiments, the ALU is configured to perform parallel execution of processes (e.g., multiply/accumulate calculations, minimum/maximum calculations, or the like), for example associated with the convolution components 212, the pooling components 216, or the FC components. The memory fetch units 606 are each configured to execute fetch, unpack, decompress, or decoding processes on the packed/compressed data concurrently with ALU operations being performed on the CPU 604, thereby accelerating ANN computations without the need of complex SMID extensions. For example, the memory fetch units 606 are configured to generate new output data for the CPU 604 while the CPU 604 performs ALU processes on previous output data provided by the memory fetch units 606.

In an embodiment, the memory fetch units 606 each comprise a fetch address generator unit 608, a sparse gather unit 610, and a data unpacking unit 612. The fetch address generator unit 608 is configured to determine or generate addresses and sub-word data-item selection information of the packed/compressed data stored in the memory storage device 614. The addresses generated by the fetch address generator unit 608 comprises a first set of addresses associated with stored elements in the packed/compresses data and a second set of addresses associated with generated elements in the packed/compressed data. Further, the sparse gather unit 610 is configured to selectively fetch stored packed/compressed data from the memory storage device 614 while ignoring (i.e., not fetching) generated packed/compressed data based on the addresses and sub-word data-item selection information from the fetch address generator unit 608. By ignoring the generated packed/compressed data, a number of read/fetch operations performed on the memory storage device 614 may be reduced, thereby decreasing time required to fetch the packed/compressed data. In some embodiments, the stored packed/compressed data corresponds to the first set of addresses associated with the stored elements and the generated packed/compressed data corresponds to the second set of addresses associated with the generated elements. Furthermore, the data unpacking unit 612 is configured to generate output data based on the stored packed/compressed data fetched from the memory storage device 614 and the predefined data structure. The output data is configured according to the predefined data structure and is subsequently streamed to the CPU 604 for data processing or is stored in output register(s) where the output data can be fetched by the CPU 604 at a later time. In further embodiments, the memory fetch unit 606 may fetch, unpack, and format new packed/compressed data from the memory storage device 614 concurrently with the CPU 604 processing output data from the output register(s). This may further increase speedup gains of completing an ANN algorithm on the system 600.

Figure 7:
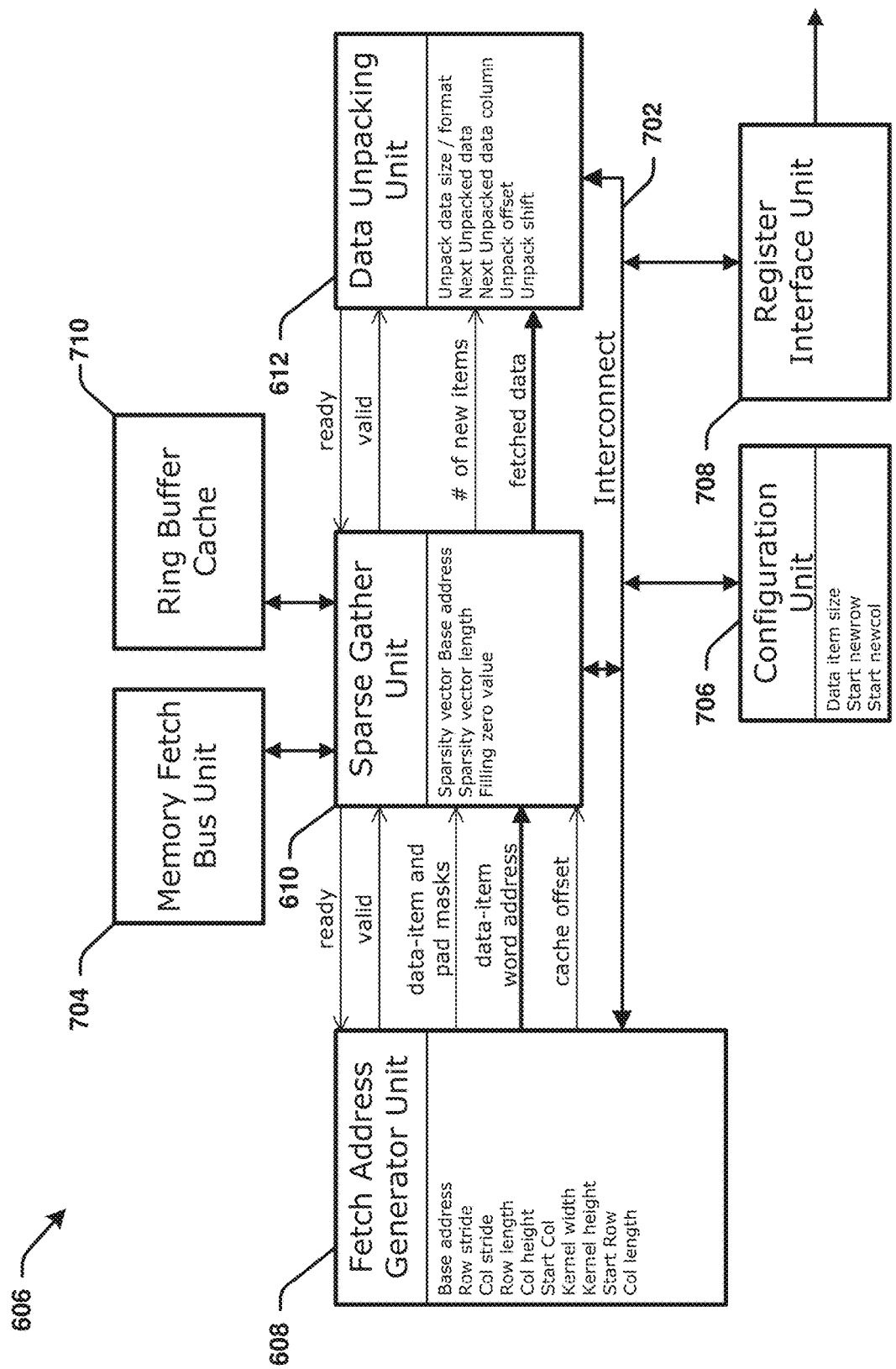
FIG. 7 is a block diagram illustrating various components of a data fetch unit according to various aspects described.

Referring to FIG. 7, illustrated is a detailed example of components of the memory fetch unit 606 of FIG. 6 in accordance with various aspects or embodiments. The memory fetch unit 606 includes a memory fetch bus unit 704, the fetch address generator unit 608, the sparse gather unit 610, the data unpacking unit 612, a configuration unit 706, and a register interface unit 708 coupled to one another via a fetch unit interconnect 702. In an aspect, the fetch unit interconnect 702 may be coupled to the processor interconnect 602. In an embodiment, the memory fetch unit 606 accesses or performs memory read operations on the memory storage device 614 through the CPU 604 (e.g., the memory fetch unit 606 accesses memory through the CPU 606 via a co-processor interface).

The memory fetch bus unit 704 is coupled to the CPU 604 and the memory storage device 614, and is configured to perform memory read operations on the memory storage device 614. The configuration unit 706 is configured to provide configuration parameters to other components in the memory fetch unit 606. For example, the configuration parameters can include memory location, layout, and packing format information of packed sub-word data stored on the memory storage device 614.

The fetch address generator unit 608 is configured to use layout and packing format information of the packed/compressed data to generate a stream of word addresses and sub-word data-item selections. In an embodiment, the generated word addresses and sub-word data-item selections correspond to data for sequence inputs required to implement inner loops of an ANN operation on the convolution components 212 of the convolution layer 202 or on the FC components of the FC layer 208 (e.g., sweeping a kernel across the minor-axis array of inputs for convolution operations or an individual neuron for dense layers). For example, the fetch address generator unit 608 may be configured to generate the stream of word addresses and sub-word data-item selections for a minor-axis iteration of two dimensional convolution operations on a dense two dimensional array of fixed-size packed sub-word data. In such embodiments, the word addresses and sub-word data-item selections can be generated for a data-stream corresponding to the kernel "footprints" of a two dimensional kernel filter sliding over the minor-axis of the data array. Thus, the fetch address generator unit 608 comprises kernel convolution parameters such as a row stride, column stride, kernel filter width, kernel filter height, or the like that may be used to complete a convolution operation (e.g., on the CPU 604). Further, generating the stream of word addresses (and corresponding sub-word item selections) for a one dimensional input/kernel filter may be implement as discussed above in relation to the two dimensional kernel filter, where the kernel filter height is set to 1 and the kernel filter width is equal to the size of the one dimensional input data.

The sub-word data-item selection information includes the number and position (i.e., sub-word item number and sub-word item position) of packed data-items associated with the addresses of the memory word(s); and a suppression indicator of which packed data-items whose fetch should be suppressed and replaced by a zero/null value in subsequent processing. Thus, the sub-word data-item selection information indicates a first set of addresses associated with stored elements (e.g., packed data-items associated with addressed memory word(s)) in the packed data stored on the memory storage device 614, and a second set of addresses associated with generated elements (e.g., packed data-items whose fetch should be suppressed and replaced by a zero/null value in subsequent processing) in the packed data. Further, the sub-word data-item selection information includes a pad mask that corresponding to whether a packed data-item will be fetched or ignored. Thus, the pad mask may act as the suppression indicator of which packed data-items whose fetch should be suppressed and replaced by a zero/null value in subsequent processing. For example, a pad mask comprising all "0"s (e.g., the pad mask is a 4 bit data structure containing 0, 0, 0, 0) indicates that a fetch of the correspond packed data-item should be suppressed in subsequent processing steps.

The generated elements associated with the second set of addresses may correspond to zero "padding" of a convolution layer's input, and therefore have a suppressed fetch as indicated by the sub-word data-item selection information. Thus, input padding of a convolution layer's input is defined in terms of "dummy" (i.e., not physically present) memory locations allowing all kernel footprint locations to be treated uniformly. By suppressing the fetch of the generated elements from the memory storage device 614, a number of read/fetch operations performed by the memory fetch unit 606 is reduced, thereby decreasing time required to fetch packed data-items in subsequent processing steps. In some embodiments, if input arrays' minor axes of a convolution layer are word-aligned with left-side padding corresponding to row positions with a coordinate less than 0 (high msb), then the generated elements are aligned with the left-side of the input arrays. By localizing the generated elements of a convolution layer's input array to the left-side of the input array, operations of the memory fetch unit 606 can be efficiently implemented while sliding a filter kernel across the input array during a convolution.

By specifying the packed data-items to be fetched in terms of word addresses and sub-word item positions, packing formats with packed data-items narrower than bytes or unaligned with byte addresses can be supported. Optimum bit widths for quantizing ANN weights and activations are application dependent, thus this flexibility in selecting packed data-items widths increases flexibility of the memory fetch unit 606. However, in some embodiments, packing formats that split packed data-items across word-boundaries are likely to disproportionately complicate implementation and trade-off gains diminish with increased bit-width. Thus, packed data-items having word-aligned layouts without excessive unused bits mitigate implementation complications and diminishment of trade-off gains. For example, if the memory storage device 614 is configured to store 32-bit words, then the 32-bit words comprising 1, 2, 3, 4, 5, 6, 8, 10, 16, and 32 bit data-items with 4, 6, 8 10 and 16 bit items may optimize fetching of packed data-items from the memory storage device 614. Further, it will be appreciated that the memory storage device 614 storing words with other bit values is within the scope of the present disclosure.

In an embodiment, the CPU 604 may reprogram the format information of the packed/compressed data such that the fetch address generator unit 608 can change between different packing formats within a single kernel convolution (e.g., different quantization parameters for different channels in a convolution network layer). In another aspect, a formant information indicator may be coupled to the fetch address generator 608 and can facilitate programming of multiple parameter sets corresponding to different packing formats for the packed/compressed data, such that changing the format information indictor may facilitate rapid switching between the different packing formats for a current set of packed/compressed data being processed by the fetch address generator 608. may be coupled to the In an embodiment, the memory fetch unit 606 is referred to as a data streaming device that is configured to process data stored on the memory storage device 614 and provide a continuous output stream to the CPU 604. Further the memory fetch unit 606 is configured to provide the continuous output stream concurrently with the CPU 604 processing the output stream. In an aspect, the fetch address generator unit 608 may be referred to as an address generator component configured to generate a plurality of data addresses of the data stored on the memory storage device 614. Further, the fetch address generator unit 608 is configured to generate a suppression indicator (e.g., a pad mask) for each of the plurality of data addresses, and wherein selected data is imported based on the suppression indicator. The suppression indicator is associated with data to be replaced by generated data (e.g., bit padding) according to the predefined data structure.

The sparse gather unit 610 is configured to selectively fetch stored packed data-items from the memory storage device 614 while ignoring (i.e., not fetching) generated packed data-items based on the word addresses and sub-word data-item selection information from the fetch address generator unit 608. Subsequently, the fetched stored packed data-items are transferred to the data unpacking unit 612 for decompressing, unpacking, or reformatting. In an aspect, the generated packed data-items may be implicit in a predefined format of the packed data-items, such as, zero padding at the margins or skipped elements in sparse data, for example. In an embodiment, the packed data-items may be or comprise sparse data such that the sub-word data-item selection information includes a corresponding sparse-map bit-vector. The sparse-map bit-vector may be generated by the fetch address generator unit 608 or may be memory mapped in the memory storage device 614. The sparse-map bit vector may be used to identify stored packed data-items that must be fetched from the memory storage device 614 and generated packed data-items whose fetch is suppressed.

In an embodiment, the sparse gather unit 610 may be referred to as a data fetch component that is configured to import selected data from the memory storage device 614 based on the word addresses. In an aspect, the sparse gather unit 610 is further configured to import the selected data at least partially from an instruction memory of the CPU 604, and is further configured to share resources with an instruction fetch device of the CPU 604. Further, the sparse gather unit 610 is configured to skip data based on control information that is either pre-defined or fetched from memory, where the control information may include the word data-item selection information, information relating to a pre-defined format of the import selected data (e.g., zero padding at the margins or skipped elements in sparse data), a sparse-map bit-vector corresponding to the import selected data, or the like. In a further embodiments, the sparse gather unit 610 is configured to decompress contiguous runs of variable-length coded data that can be associated with the import selected data. For example, the variable length coded data may include Huffman coded data. In an embodiment, the selected data includes multiple data-items and the sparse gather unit 610 is configured to transfer the multiple data-items in parallel with the data unpacking unit 612 that is supplying a continuous output stream to the CPU 604.

In an embodiment, the packed data-items on the memory storage device 614 may be or comprise dense data that includes a corresponding "all ones" bit-vector that indicates the presence or absence of data. To increase efficiency, the all ones bit-vector may be generated internally in the sparse gather unit 610 or may be fetched from memory. To further increase efficiency and decrease overall time required to complete the decompressing, unpacking, or reformatting of packed data, multiple stored packed data-items may be transferred in parallel to the data unpacking unit 612. Further, a bus-interface between the sparse gather unit 610 and the data unpacking unit 612 may be configured to support multi-word burst transfers. In such embodiments, the sparse gather unit 610 may transfer the stored packed data-items to a read-ahead cache (e.g., a small 4 to 8 entry cache unit) that is directly coupled to the data unpacking unit 612. This further increases efficiency of the memory fetch unit 606. In some embodiments, the sparse gather unit 610 is configured to selectively fetch new stored packed data-items from the memory storage device 614 concurrently with the data unpacking unit 612 decompressing, unpacking, or reformatting the stored packed data-items. In such embodiments, the new stored packed data-items may be stored in the read-ahead cache while the unpacking unit 612 receives/processes the stored packed data-items from the read-ahead cache.

In some embodiments, the sparse gather unit 610 is configured to selectively fetch stored sparse packed data-items from memory using the generated word addresses, the suppression indicator (e.g., pad mask), and a sparsity-map bit-vector. The sparsity-map bit-vector may be generated by the fetch data unit 606 or mapped to memory. Sparse packed data-items marked as absent by the sparsity-map bit-vector may be programmed as a part of the stream parameters outputted from the sparse gather unit 610 to the data unpacking unit 612. For example, the sparse packed data-items marked as absent may either be skipped (e.g., elided from the stream of output parameters) or replaced by a programmable zero/null value, thereby further increasing computation and unpacking efficiency. In an embodiment, zero-weight products for weighted sum of product calculations can be skipped by packing non-zero weights (e.g., kernel weights) and using the corresponding sparsity-map bit-vector to skip input data that corresponds to zero weights, thereby increasing processing efficiency of ANN algorithms on the CPU 604.

A ring buffer cache 710 may be part of the sparse gather unit 610 or may be coupled to the sparse gather unit 610 via the fetch unit interconnect 702. For example, the ring buffer cache 710 may be directly attached/directly electrically coupled to the sparse gather unit 610. The ring buffer cache 710 is configured to store the memory words (e.g., the stored packed data-items) fetched by the sparse gather unit 610 based on the word addresses provided by the fetch generator unit 608. As the fetch generator unit 608 provides new word addresses to the sparse gather unit 610, the memory words associated with the new word addresses may correspond to the memory words already stored on the ring buffer cache 710. Thus, the memory words associated with the new word addresses are repeated words. In such embodiments, the sparse gather unit 610 may suppress a fetch of the repeated words from the memory storage device 614 associated with the new word address. Further, the sparse gather unit 610 may read stored packed data-items associated with the repeated words from the memory words stored on the ring buffer cache 710. This reduces or eliminates redundant fetches performed on the memory storage device 614, thereby increasing fetching efficiency of the sparse gather unit 610. In an embodiment, the repeated words can be referred to as redundant memory words.

Figure 8:
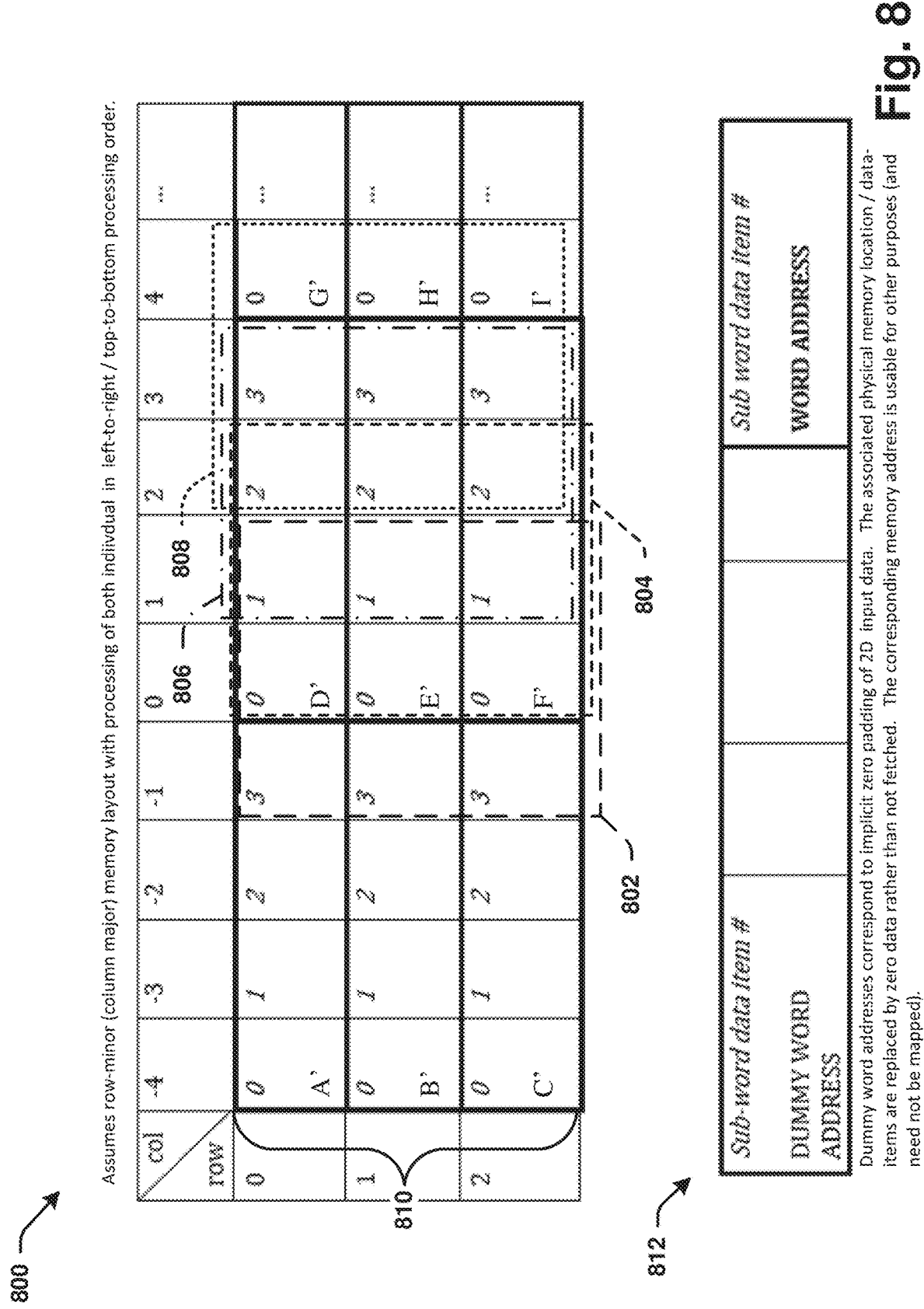
FIG. 8 illustrates a memory layout of an input array for a two dimensional convolution process where adjacent kernel footprints overlie the memory layout according to various aspects described.

For example, a convolution operation may comprise iterating over a minor-axis of a dense two dimensional array with a minor axis stride of one, thereby resulting in sequential kernel footprints over the data array (e.g., see FIG. 8). The stream of word addresses generated by the fetch generator unit 608 for sequential kernel footprints is deterministic and highly repetitive. This is because adjacent kernel footprints overlap one another, such that stored packed data-items corresponding to the stream of word addresses may comprise one or more repeated words. The ring buffer cache 710 is configured to eliminate redundant fetches of the one or more repeated words from the memory storage device 614. In an embodiment, a last-in first order of the ring buffer cache 710 is achieved if the buffer order of the ring buffer cache 710 is transposed and minor-axis reversed with respect to the ordering of the generated word addresses. For example, kernel memory word addresses generated for kernel footprint positions corresponding to a kernel footprint of maximal W×H words (with W and H being a positive integer that can be the same or different) in a row-minor order may be represented as: [(0,0), (1,0), . . . , (W−1,0), (0,1), . . . , (W−1,1), . . . (0,H−1), . . . , (W−1, H1−1)]. Further, after fetching memory words based on word addresses corresponding to a first location of the kernel footprint, the fetched memory words may be stored on the ring buffer cache 710, such that the ring buffer cache 710 contents are represented as: [ . . . , (W−1, 0), W−1, 1), . . . , (W−1, H−1), (W−2, 0), . . . , (W−2, H−1), . . . , (0,0), . . . (0,H−1)]. Further, the ring buffer cache 710 comprises a B-word ring buffer memory segment (with B being a positive integer such as 8, 16, 32, or another suitable value) and a current end position e, such that a value of a kernel memory word (x,y) (with x and y being zero or a positive integer that can be the same or different) will be cached at an address of the ring buffer cache 710 as represented by the equation $|e+(y,H_x)|_B$. Each time the kernel footprint top-left is shifted to an adjacent kernel footprint location, a column(s) of memory words are added and d column(s) of memory words are dropped (with a and d being zero or a positive integer that can be the same or different), and e is incremented by dH (the number of words no longer in the current kernel footprint). In such embodiments, memory words from columns [0, H−1−a] may be taken from the ring buffer cache 710, while new memory words corresponding to new columns [H−a, H−1] may be fetched from the memory storage device 614 and copied to the ring buffer cache 710.

In an embodiment, the ring buffer cache 710 may be employed for kernels with kernel footprints that exceed a size of the cache by only caching a suitable subset of values. For example, by setting W smaller than the actual maximum number of kernel footprint columns and fetching from memory for kernel positions (x,y) where W−1−x is less than zero. In further embodiments, the multiplication carried out to calculate the location of a kernel word cached in the ring buffer cache 710 may not require a large multiplier block. For example, ANN algorithms with parameters sets sufficiently small for a compact uC, the kernel footprint dimensions (H,W) comprising 8-bits is sufficient. Further, for one dimensional kernel filters (where W may be large), H is 1 so that the multiplier used to determine the location of the kernel word cached in the ring buffer cache 710 may be omitted, thereby increasing processing efficiency. In alternative embodiments, the location of the kernel word cached in the ring buffer may be determined iteratively by adding/subtracting from a H*(W−1) value that is pre-computed by the CPU 604.

Further, the data unpacking unit 612 is configured to generate output data based on the stored packed data-items that were selectively fetched by the sparse gather unit 610. In an embodiment, the data unpacking unit 612 may decompress, unpack, or format the stored packed data-items into a form suitable for the CPU 604 to perform arithmetic or logic operations on the corresponding output data. In an aspect, the output data generated by the data unpacking unit 612 is configured to match at least one of a predefined precision, a predefined layout, or a predefined data structure. The predefined precision, predefined layout, or predefined data structure may, for example, each comprise information that includes a data size, a data format, a data offset value, or a data shift value of the generated output data. In some embodiments, the predefined data structure may be or comprise a padded dense 2D array, a padded 1D data-vector, a dilated padded 2D array and a dilated padded 1D vector, a 1D vector with elements skipped according to a corresponding sparsity map (i.e., a sparse-map bit-vector), or the like. The register interface unit 708 may comprises one or more output register(s) that are configured to store the output data generated by the data unpacking unit 612. Thus, the output data may be fetched by the CPU 604, from the output register(s), for subsequent processing steps. Further, output data may be configured with sign/zero extensions, according to the predefined data structure, to support specified word widths and repacking structures defined by the CPU 604 to match SIMD data-formats of the CPU 604. Further, the data unpacking unit 612 is configured to decode the stored packed data-items based on at least one of an offset value, bit-shifting value, scaling, rounding, a look-up table, or variable length coding (e.g., Huffman coding) that may each be stored in memory. In some embodiments, the stored packed data-items may be encoded using scaled/offset quantization schemes, such that decoding the corresponding stored packed data-items based on the offset value or bit-shift value decreases a time required to carry out the decoding. Further, the stored packed data-items may, for example, be encoded using non-linear quantization schemes (e.g., logarithmic encoding of statistical clustering), such that decoding the corresponding stored packed data-items based on the look-up table(s) decreases a time needed to carry out the decoding. This reduces a time needed to generate the output data and further increases power efficiency of the memory fetch unit 606. In some embodiments, the stored packed data-items may not be formatted before being stored on the memory storage device 614 such that the data unpacking unit 612 does not perform formatting (e.g., no decompressing or compressing is performed). This may increase an efficiency of the memory fetch unit 606.

In an aspect, the data unpacking unit 612 may be referred to as a data formatting component that is configured to generate the output data as a continuous stream to the CPU 604. Further, the data unpacking unit 612 is configured to provide data formats matching the stored packed data-items and a data instruction set of the CPU 604, where the data formats and data instruction set are provided by the CPU 604 or memory storage device 614.

To enable efficient transfer of the output data to the CPU 604, a hardware/software (HW/SW) interface may be implemented between components of the memory fetch unit 606 (e.g., the output register(s), the fetch address generator unit 608, the data unpacking unit 612, etc.) and the CPU 604. In such embodiments, an observation unit may be coupled between the CPU 604 and the components of the memory fetch unit 606. As soon as the observation unit determines that the CPU 604 fetched an unpacked data-item from the output data stored on the output register(s), the observational unit can detect this event and provide a trigger to the data unpacking unit 612 or fetch address generator unit 608 over the HW/SW interface to initiate unpacking of a next packed data-item, switching to the next row of a kernel, or other specified actions that operate in parallel with the CPU 604 processing the fetched unpacked data-item. For example, the output data may be presented on the output register(s) at multiple register addresses, such that as soon as the CPU 604 fetches output data from a specific address on the output register(s), the observational unit can detect which address was accessed and trigger a specific action according to the corresponding specific address. Further, the CPU 604 fetch may be synchronized with availability of newly provided output data from the sparse gather unit 610 by halting the CPU 604 via wait-states rather than requiring programmed polling of status information. This decreases processor wait time that may otherwise be used to poll the status information, thereby decreasing processor wait time and further increasing power efficiency during ANN computations.

The interconnect 702 can comprise interconnects (e.g., on chip bus interconnects) that connect the various components of the memory fetch unit 606 to one another. The memory fetch bus unit 704 may be configured as a memory fetch bus master or may be configured as a uC co-processor memory interface such that the components of the memory fetch unit 606 are closely coupled to the CPU 604 or the memory storage device 614 via the memory fetch bus unit 704. In addition, the memory fetch bus unit 704 can be used by the fetch address generator unit 608 to fetch data from memory and store data back in a memory (e.g., such as the ring buffer cache 710 or another suitable memory), for example. The register interface unit 708 may be configured as a configuration and output bus slave or may be configured as a uC co-processor register interface such that components of the memory fetch unit are closely coupled to registers/memory of the CPU 604 or the memory storage device 614. In addition, the register interface unit 708 can be used by the data unpacking unit 612 to program registers/memory of the CPU 604 or the memory storage device 614, for example.

The components of the memory fetch unit 606 can be pipelined with respect to one another or with respect to the CPU 604, leading to significant speed up gains by enabling data flow processors to being processors sectors of each component's outputs immediately upon availability. In some embodiments, the components of the memory fetch unit 606 may be configured as a simple sequential state-machine or as a deeply pipelined parallel implementation where processing multiple address/fetches/data-items in parallel is possible. In an embodiment, the components of the memory fetch unit 606 are configured to provide throughput that matches a capacity of the CPU 604 to process the fetched and unpacked data-items. This increases power/area efficiencies in compact uC devices. For example, for a compact uC device, with no SIMD capabilities, the components of the memory fetch unit 606 being configured as a fully sequential state-machine would facilitate the throughput of the memory fetch unit 606 matching the capacity of the compact uC device to process the corresponding output data while minimize power consumption and increasing cost savings. In another example, for a high performance uC device (e.g., higher clock speeds relative to memory throughput and SIMD processing), the components of the memory fetch unit 606 being pipelined with one another and being able to deliver one or more output data-items per CPU clock cycle would facilitate throughput that matches a capacity of the high performance uC device. This may allow unpacked data-items to be generated from one fetched memory word and to be subsequently output for data processing while concurrently preforming memory reads to fetch following packed data-items, thereby further contributing to additional speedup gains. Further, the components of the memory fetch unit 606 being pipelined with one another may allow for increased streaming gather/unpack efficiencies while executing channel-wise convolution operations (e.g., pooling, depth-wise separable convolution) using row-minor (CHW) memory layouts that may avoid a need for memory storage of partial results, while storing pruned parameter sets (e.g., sparse data) regardless of layout. In an aspect, the memory fetch unit 606 may comprise a small buffer memory (e.g., the ring buffer cache) that may be managed directly by the pipeline, thereby achieving high efficiency caching performance.

Referring to FIG. 8, illustrated is an example of a memory layout of an input array for a two dimensional convolution process showing packed data-items to be fetched for adjacent kernel footprints 802-808 in accordance with various aspects/embodiments herein. Convolution operations can be utilized by convolution components 212 of a convolution layer 202 or as a combined convolution layer 230 with RELU components 214 as described above with reference to FIG. 2. Convolution components 212 of the convolution layer 230 can be configured to generate weighted multiplications and summations, for example. In terms of signal processing, these operations can be single dimensional, and in the case of image processing, the convolution operations can be two-dimensional such that there can be various weights along an X axis and a Y axis that weigh the inputs differently or similarly by an amount for which each is to be factored or considered in further processing.

In one embodiment, the packed data-items may be or comprise a two dimensional array of values stored in the memory storage device 614 that have corresponding memory addresses 810. These values can be representative of an area of packed data or packed annotated values that may be provided as inputs to one or more convolution components 212 after being fetched and unpacked from memory. The values in the two dimensional array may have been captured by sensors 102 (e.g., image/camera/video capturing sensors or the like) and subsequently stored in the memory storage device 614 as packed data-items. The values that may be accessed at the memory addresses 810, for example can correspond to an image or a subsection/subset of image data, and may be used for convolution operations by the convolution components 212 or components of the combined layer 230. Further, the packed data-items may each be partitioned into four sub-word data-items with corresponding addresses A', B', C', D', E', F', G', H', I'. For example, an address A' may represent a first memory word comprising four sub-word data-items with a beginning coordinate (−4,0) in the two dimensional array of values, and an address B' may represent a second memory word comprising four sub-word data-items with a beginning coordinate (1,−4) in the two dimensional array of values, and so on. Further, a first sub-word data-item of the first memory word may be accessed at the address A'[0], a second sub-word data-item of the first memory word may be accessed at the address A'[1], and so on.

As stated above with reference to FIG. 3, a convolution is a mathematical operation in which a filter kernel can be slid across an image with the aim of detecting in it the presence of the feature represented by the filter kernel. As illustrated in FIG. 8, a plurality of kernel footprints 802-808 are each positioned over a fixed area of the memory addresses 810. Each kernel footprint 802-808 may have a kernel size of 3×3 and the filter kernel may have a stride of 1, for example. The kernel footprints 802-808 illustrate locations/regions in which a filter kernel may be placed to detect the presence of a feature in the data-items stored at the memory addresses 810. For example, the filter kernel may be configured to slide (e.g., from left to right) from a first kernel footprint 802 to a second kernel footprint 804, from the second kernel footprint 804 to a third kernel footprint 806, and subsequently from the third kernel footprint 806 to a fourth kernel footprint 808. Further, a word memory layout 812 illustrates an example layout of the sub-word data-items stored at the corresponding memory addresses 810. The "dummy" word address corresponds to implicit zero padding of the two dimensional input array, and the word address may correspond to stored packed sub-word data-items. By using the dummy word addresses (whose fetch is later suppressed) implicit zero padding (no memory overhead) may be achieved while, for example, maintaining a simple control state-machine.

Referring to FIG. 9, illustrated is a table 900 comprising examples of representative address generation and sparse gather inputs/outputs generated based on a sparse kernel 902 in accordance with various aspects/embodiments herein.

The sparse kernel 902 may be stored in memory as a packed vector 904 (e.g., containing W0, W2, W5, W8) with a fetch/skip vector 905 (e.g., containing 1, 0, 1, 0, 0, 1, 0, 0, 1). The sparse kernel 902 comprises word addresses W0, W1, W2, W3, W4, W5, W6, W7, and W8 corresponding to sparse data. The word addresses in the sparse kernel 902 comprise a first set of word addresses (e.g., the word addresses in the packed vector 904) corresponding to stored packed data-items, and a second set of word addresses (e.g., containing W1, W3, W4, W6, W7) corresponding to elements that may be skipped (i.e., not fetched) in the spare data. The fetch/skip vector 905 serves as an indicator of which values in the word addresses should be skipped and which values in the word addresses should be fetched for processing (e.g., for a convolution process). The fetch/skip vector 905 may be configured as or referred to as a sparsity-map bit-vector associated with the sparse kernel 902. In further embodiments, the sparse kernel 902 may be configured as a one dimensional dilated input kernel, a two dimensional dilated input kernel, or the like. The word addresses W0, W2, W5, and W5 of the packed vector 904 may correspond to the kernel footprint positions 802-808 of FIG. 8, in which the packed data-items at the corresponding word addresses W0, W2, W5, and W8 may be used for a subsequent convolution process performed on the CPU 604.

The table 900 comprises a plurality of columns 906-928 that correspond to input/output values of the fetch address generator unit 608 and the sparse gather unit 610 while processing inputs for the sparse kernel 902. The fetch address generator unit 608 comprises five columns in the table 900, namely a kernel item coordinate column 906, a fetch word address column 908, a first item number column 910, a number of items column 912, and a pad mask column 914. The kernel item coordinate column 906 comprises the top-left coordinate of a starting location for a corresponding kernel footprint position. For example, the kernel item coordinate (−1,0) may correspond to the top-left coordinate of the first kernel footprint 802, the kernel item coordinate (0,0) may correspond to the top-left coordinate of the second kernel footprint 804, and so on. The fetch address generator unit 608 is configured to generate a stream of word addresses (e.g., the fetch word address column 908), and sub-word data-item selections (e.g., the first item number column 910, the number of items column 912, and the pad mask column 914) for each kernel item coordinate in the column 906.

The fetch word address column 908 comprises fetch word addresses that correspond to at least a segment of word addresses within a window of the corresponding kernel footprint position. For example, the first kernel footprint 802 is positioned at least partially over segments of the word addresses A'-F' that correspond to fetch word addresses of the first kernel footprint 802, the second kernel footprint 804 is positioned at least partially over segments of the word addresses D'-F' that correspond to fetch word addresses of the second kernel footprint 804, and so on.

The first item number column 910 indicates a location of a first sub-word data-item that is included within a window of a kernel footprint position for each fetch word address in the column 908. The number of items column 912 comprises a number of sub-word data-items within a window of a kernel footprint position for each fetch word address in the column 908. Further, the pad mask column 914 indicates a pad mask for each fetch word address in the column 908. In an embodiment, the pad masks serve as a suppression indicator as to whether packed sub-word data-items at a corresponding fetch word address will be fetched or ignored. The pad masks may be determined from coordinates of the packed sub-word data-items stored in the corresponding fetch word addresses. This is because padding data or skipped data elements are implicit in the generated elements of the packed data stored at the fetch word addresses. Furthermore, a pad mask comprising all "0"s indicates that a fetch of the corresponding packed sub-word data-items should be suppressed by the sparse gather unit 610.

A cache, such as the ring buffer cache 710, of the memory fetch unit 606 comprises three columns in the table 900, namely an add/drop column 916, a cache coordinate column 918, and a cache address column 920. The add/drop column 916 corresponds to columns of packed memory words added to or dropped from the cache during a corresponding kernel footprint position. The number of columns added to or dropped from the cache may be determined based on how the left and right hand "edges" of the kernel footprint crosses word boundaries as the kernel is shifted from a kernel footprint position to an adjacent footprint position. For example, at the first kernel footprint position 802, two columns of packed memory words are added to the cache based on the corresponding fetch word addresses (e.g., the packed memory words corresponding to the memory addresses A'-C' and the packed memory words corresponding to the memory addresses D'-F'). Further, as the kernel slides from the first kernel footprint position 802 to the second kernel footprint position 804, a left hand edged of the kernel crosses a word boundary (e.g., between column −1 and column 0), this results in the cache dropping a column of packed memory words (corresponding to the memory addresses A'-C'). This may be repeated until all kernel footprint positions are exhausted. In addition, if the right hand edge of the kernel crosses a word boundary, then a column of packed memory words may be added to the cache. The cache coordinate column 918 comprises kernel memory word addresses generated for kernel footprint positions, where a maximal footprint word dimension is represented by (W,H) (with W and H being a positive integer that can be the same or different). Further, the cache address column 920 comprises an address in the cache that corresponds to the location of a corresponding kernel memory word.

The sparse gather unit 610 of the memory fetch unit 606 comprises four columns in the table 900, namely a remaining fetch/skip column 922, a word aligned fetch/skip column 924, a memory read column 926, and an output item column 928. The remaining fetch/skip column 922 illustrates underlined bits of the fetch/skip vector 905 that correspond to a number of packed sub-word data-items that may be fetched for a corresponding fetch word address. The word aligned fetch/skip column 924 corresponds to bits that indicate packed sub-word data-items to be fetched for a corresponding fetch word address. The memory read column 926 indicates when a memory read operation is performed to fetch packed word data for a corresponding fetch word address or when a memory read operation is suppressed for a corresponding fetch word address. For example, unitalicized fetch word addresses in the memory read column 926 indicate when the sparse gather unit 610 fetches the corresponding packed word directly from memory (e.g., from the memory storage device 614), and fetch word addresses that are italicized and underlined indicate when the sparse gather unit 610 fetches the corresponding packed word directly from the cache (e.g., from the ring buffer cache 710).

In an embodiment, each fetch word address comprises a number of data-items/(column 912 for the corresponding fetch word address) that may be fetched and subsequently output by the sparse gather unit 610 for subsequently processing (e.g., to the data unpacking unit 612). The number of data-items/can be used to shift bit(s) out of a left hand side of a remaining fetch/skip vector R (column 922), such that the remaining fetch/skip vector R is consumed when traveling from a top of column 922 to a bottom of the column 922 for a corresponding kernel footprint. Further, a first data-item number n (column 910) may be represented as 0 padding-bits, configured to word align the bit(s) shifted out of the vector R. For example, for the fetch word address A' in the kernel item coordinate (−1, 0) the first data-item number n may be configured as padding-bits represented as 0, 0, 0 and the padding-bits are subsequently prepended to the bit(s) shifted out of the vector R such that a resulting word aligned fetch/skip mask may be represented as 0, 0, 0, 1. Subsequently, a bitwise AND operation is performed on the resulting word aligned fetch/skip mask (containing 0, 0, 0, 1) and the corresponding pad mask (containing 0, 0, 0, 0) to generate a corresponding word aligned fetch/skip vector F (column 926) containing 0, 0, 0, 0. The sparse gather unit 610 is configured to repeat this process for each fetch word address in column 908, thereby generating the vector F for each fetch word address in column 908.

Further, the word aligned fetch/skip vector F is configured to indicate fetch locations corresponding to packed sub-word data-items that are fetched from a corresponding fetch word address, and fetch suppression locations that may correspond to packed sub-word data-items that are not fetched and instead the corresponding unfetched packed sub-word data-items may be output as zero values. Bit values of the vector F(i) comprising a value of "1" indicates a fetch location for a corresponding fetch word address, and a value of "0" indicates a fetch suppression location of the corresponding fetch word address, wherein i is an index that may comprise 0, 1, 2, 3. For example, a vector F(i) corresponding to the fetch word address D' in the kernel item coordinate (0, 0) may be represented as 1, 0, 1, 0, where a first packed sub-word data-item of the fetch word address D' is fetched from memory (e.g., a memory device or the cache unit) corresponding to the address D'[0], and a third packed sub-word data-item of the fetch word address D' is fetched from memory corresponding to the address D'[2]. In such embodiments, a second packed sub-word data-item and a fourth packed sub-word data-item of the fetch word address corresponding to the addresses D'[1] and D'[3], respectively may have their fetches suppressed and may be output as zero values.

The sparse gather unit 612 is configured to determine the output items column 928 for each fetch word address. Further, empty or 0 values in the output items column 928 may be output as padding data for subsequent processing steps. In one embodiment, the sparse gather unit 612 is configured to output packed sub-word data-items from each fetch word address sequentially. For example, for the kernel item coordinate (0,0) two packed sub-word data-items needed to be output for the fetch memory word D' is output as D'[0] then D'[2].

Figure 10:
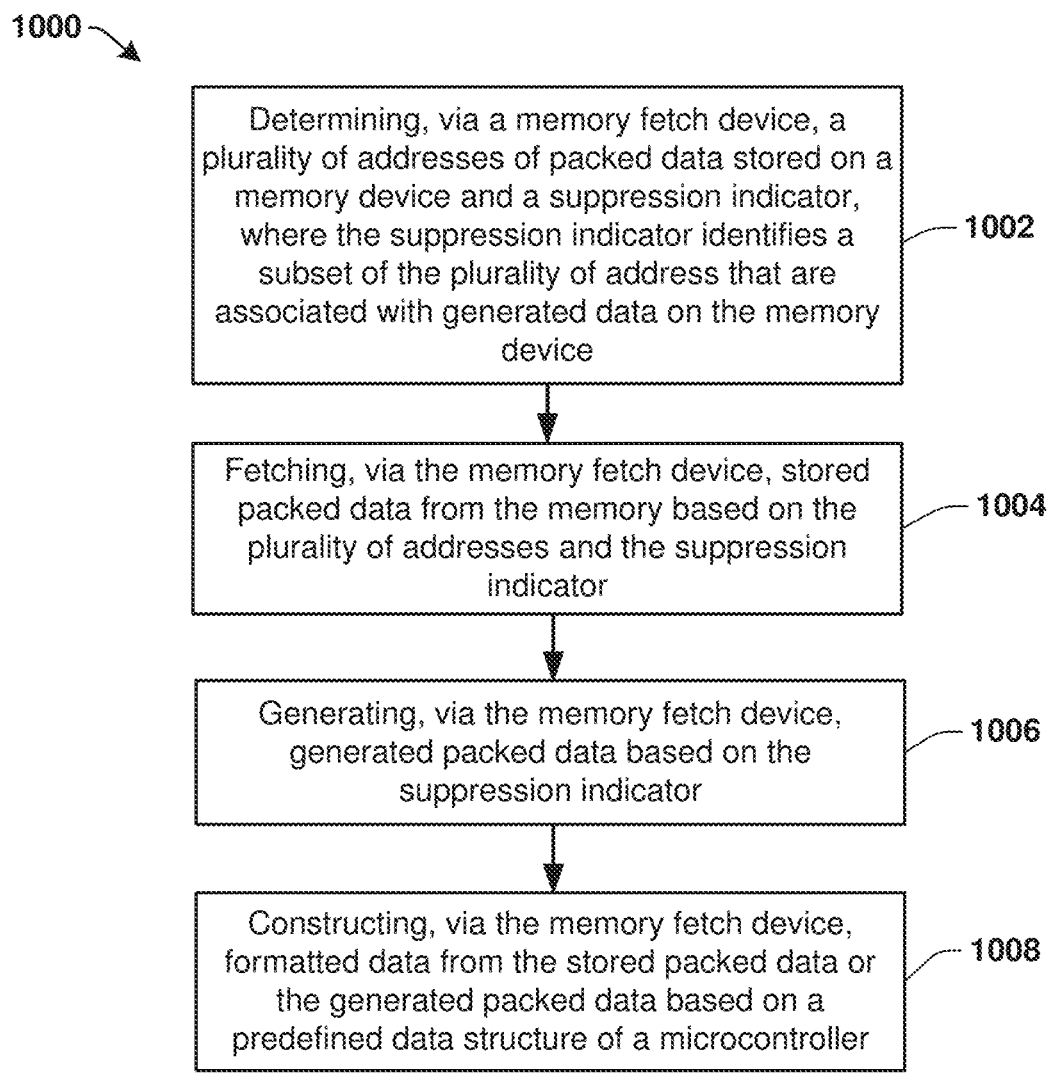
FIG. 10 is a flow diagram illustrating a process flow according to various aspects described.

With reference to FIG. 10, illustrated is a process flow 1000 for accelerating executions of gathering and unpacking data for ANN computations on a compact microcontroller (uC) device according to various aspects/embodiments/details described in this disclosure. The method 1000 initiates at 1002 with determining, via a memory fetch device (e.g., memory fetch unit 606), a plurality of addresses of packed data stored on a memory device (e.g., memory storage device 614) and a suppression indication (e.g., a pad mask), where the suppression indicator identifies a subset of the plurality of addresses that are associated with generated packed data on the memory device (e.g., memory storage device 614). In an embodiment, the plurality of addresses correspond to fetch word addresses associated with kernel footprints corresponding to a kernel filter.

At 1004, stored packed data is fetched, via the memory fetch device, from the memory based on the plurality of addresses and the suppression indicator.

At 1006, generated packed data is generated, via the memory fetch device, based on the suppression indicator.

At 1008, formatted data is constructed, via the memory fetch device, from the stored packed data or the generated packed data based on a predefined data structure of a microcontroller (e.g., CPU 604). In an embodiment, constructing the formatted data includes decompressing or compressing the stored packed data according to at least one of an offset, bit-shifting, scaling, rounding, table look-up, and variable length coding (e.g., Huffman coding).

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus employed in a processing device comprising a processor configured to process data of a predefined data structure; a memory fetch device, coupled to the processor, configured to determine addresses of packed data for the processor, wherein the packed data is stored on a memory device that is coupled to the processor; and provide output data based on the addresses of the packed data to the processor, wherein the output data is configured according to the predefined data structure.

A second example can include the first example, wherein the memory fetch device is configured to fetch the packed data at least partially from an instruction memory.

A third example can include the first or second example, wherein the memory fetch device is configured to share resources with an instruction fetch device of the processor.

A fourth example can include any one or more of the first through third examples, wherein the packed data comprises stored data and generated data, wherein the memory fetch device is configured to determine a first set of addresses associated with the stored data and a second set of addresses associated with the generated data.

A fifth example can include any one or more of the first through fourth examples, wherein the generated data comprises padding data.

A sixth example can include any one or more of the first through fifth examples, wherein the memory fetch device is configured to selectively fetch the stored data from the first set of addresses, and wherein the memory fetch device is further configured to ignore the second set of addresses associated with the generated data.

A seventh example can include any one or more of the first through sixth examples, wherein the stored data comprises one or more redundant memory words, wherein the memory fetch device comprises a circular buffer configured to store the redundant memory words, and wherein the stored data is selectively fetched based on the redundant memory words stored in the circular buffer.

An eighth example can include any one or more of the first through seventh examples, wherein the memory fetch device is configured to selectively fetch the redundant memory words of the stored data a single time from the memory device based on the first set of addresses.

A ninth example can include any one or more of the first through eighth examples, wherein the memory fetch device is further configured to provide the output data by formatting the stored data of the packed data according to the predefined data structure of the processor.

A tenth example can include any one or more of the first through ninth examples, wherein the memory fetch device is further configured to provide the output data by further decompressing the formatted stored data.

An eleventh example can be an apparatus for an artificial neural network (ANN) comprising a microcontroller, configured to be coupled to a memory device and configured to process a data stream, wherein the data stream is configured to match at least one of a predefined precision, predefined layout or predefined data structure; a data streaming fetch device, coupled to the memory device and the microcontroller, configured to process data stored on the memory device and provide a continuous output stream to the microcontroller, wherein the data streaming fetch device comprises an address generator component configured to generate a plurality of data addresses of the data stored on the memory device; a data fetch component configured to import selected data from the memory device based on the plurality of data addresses; and a data formatting component configured to provide the continuous output stream to the microcontroller.

A twelfth example can include the eleventh example, wherein the data formatting component is further configured to provide data formats matching the selected data and a data instruction set of the microcontroller.

A thirteenth example can include any one or more of the eleventh through the twelfth examples, wherein the data fetch component is further configured to import the selected data at least partially from an instruction memory, and wherein the data fetch component is further configured to share resources with an instruction fetch device of the microcontroller.

A fourteenth example can include any one or more of the eleventh through the thirteenth examples, wherein the address generator component is configured to generate a suppression indicator for each of the plurality of data addresses, wherein the selected data is imported based on the suppression indicator, and wherein the suppression indicator is associated with data to be replaced by generated data according to the predefined data structure.

A fifteenth example can include any one or more of the eleventh through the fourteenth examples, wherein the data fetch component is further configured to skip data based on control information that is either pre-defined or fetched from memory.

A sixteenth example can include any one or more of the eleventh through the fifteenth examples, wherein the data fetch component is further configured to decompress contiguous runs of variable-length coded data.

A seventeenth example can include any one or more of the eleventh through the sixteenth examples, wherein a subset of the plurality of data addresses are associated with one or more repeated words, wherein the data fetch component comprises a ring-buffer cache that is configured to store the one or more repeated words such that the data fetch component imports the one or more repeated words a single time from the memory device, and wherein the selected data is fetched from the ring-buffer cache when already stored there.

An eighteenth example can be a method for an artificial neural network (ANN), comprising determining, via a memory fetch device, a plurality of addresses of packed data stored on a memory device and a suppression indicator, wherein the suppression indicator identifies a subset of the plurality of addresses that are associated with generated packed data on the memory device; fetching, via the memory fetch device, stored packed data from the memory based on the plurality of addresses and the suppression indicator; generating, via the memory fetch device, generated packed data based on the suppression indicator; and constructing, via the memory fetch device, formatted data from the stored packed data or the generated packed data based on a predefined data structure of a microcontroller.

A nineteenth example can include the eighteenth example, further comprising skipping, via the memory fetch device, data based on control information that is either pre-defined or fetched from memory.

A twentieth example includes any one or more of the eighteenth through nineteenth examples, wherein generating the formatted data includes decompressing or compressing the stored packed data according to at least one of an offset, bit-shifting, scaling, rounding, table look-up, and variable length coding.

Applications (e.g., program modules) can include routines, programs, components, data structures, etc., that perform particular tasks or implement particular abstract data types. Moreover, those skilled in the art will appreciate that the operations disclosed can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of computer-readable media. Computer readable media can be any available media that can be accessed by the computer and includes both volatile and non-volatile media, removable and non-removable media. By way of example and not limitation, computer-readable media can comprise computer storage media and communication media. Computer storage media includes both volatile and non-volatile, removable and non-removable media implemented in any method or technology for storage of information such as computer-readable instructions, data structures, program modules or other data. Computer storage media (e.g., one or more data stores) can include, but is not limited to, RAM, ROM, EEPROM, flash memory or other memory technology, CD ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

It is to be understood that aspects described herein may be implemented by hardware, software, firmware, or any combination thereof. When implemented in software, functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Various illustrative logics, logical blocks, modules, and circuits described in connection with aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor may be a microprocessor, but, in the alternative, processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration. Additionally, at least one processor may comprise one or more modules operable to perform one or more of the acts and/or actions described herein.

For a software implementation, techniques described herein may be implemented with modules (e.g., procedures, functions, and so on) that perform functions described herein. Software codes may be stored in memory units and executed by processors. Memory unit may be implemented within processor or external to processor, in which case memory unit can be communicatively coupled to processor through various means as is known in the art. Further, at least one processor may include one or more modules operable to perform functions described herein.

Techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical discs (e.g., compact disc (CD), digital versatile disc (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform functions described herein.

Further, the acts and/or actions of a method or algorithm described in connection with aspects disclosed herein may be embodied directly in hardware, in a software module executed by a processor, or a combination thereof. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to processor, such that processor can read information from, and write information to, storage medium. In the alternative, storage medium may be integral to processor. Further, in some aspects, processor and storage medium may reside in an ASIC. Additionally, ASIC may reside in a user terminal. In the alternative, processor and storage medium may reside as discrete components in a user terminal. Additionally, in some aspects, the acts and/or actions of a method or algorithm may reside as one or any combination or set of codes and/or instructions on a machine-readable medium and/or computer readable medium, which may be incorporated into a computer program product.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature may have been disclosed with respect to only one of several implementations, such feature may be combined with one or more other features of the other implementations as may be desired and advantageous for any given or particular application.

What is claimed is:

1. A method for an artificial neural network (ANN), comprising:
   determining, via a memory fetch device, a stream of addresses of packed data stored on a memory device and a suppression indicator, wherein the suppression indicator identifies a subset of addresses in the stream of addresses that are associated with generated packed data on the memory device;
   fetching, via the memory fetch device, stored packed data from the memory device based on the stream of addresses and the suppression indicator, wherein the memory fetch device fetches the stored packed data from the memory device sequentially, wherein the memory fetch device processes the stored packed data sequentially;
   generating, via the memory fetch device, generated data based on the suppression indicator; and
   constructing, via the memory fetch device, formatted data from the stored packed data or the generated packed data based on a predefined data structure of a microcontroller.

2. The method of claim 1, further comprising:
skipping, via the memory fetch device, data based on control information that is either pre-defined or fetched from memory.

3. The method of claim 1, wherein generating the formatted data includes decompressing or compressing the stored packed data according to at least one of an offset, bit-shifting, scaling, rounding, table look-up, and variable length coding.

4. The method of claim 1, further comprising:
reprogramming, via the microcontroller, format information of the packed data, wherein the memory fetch device changes between different packing formats while generating the generated data.

5. An apparatus employed in a processing device comprising:
a processor configured to process data of a predefined data structure, wherein the processor has as a single-issue microarchitecture and comprises special-function registers, bus agents, and an instruction fetch device;
a memory fetch device coupled to the processor, wherein the memory fetch device is configured as a sequential state-machine and is configured to:
determine addresses of packed data for the processor, wherein the packed data is stored on a memory device that is coupled to the processor;
fetch the packed data at least partially from an instruction memory;
share resources with the instruction fetch device, the special-function registers, and the bus agents of the processor, wherein the instruction fetch device is configured to fetch the instruction memory; and
provide output data based on the addresses of the packed data to the processor, wherein the output data is configured according to the predefined data structure, wherein the memory fetch device is configured to process the packed data sequentially.

6. The apparatus of claim 5, wherein the packed data comprises stored data and generated data, wherein the memory fetch device is configured to determine a first set of addresses associated with the stored data and a second set of addresses associated with the generated data.

7. The apparatus of claim 6, wherein the memory fetch device is configured to at least match a capacity of the processor processing the output data, wherein the processor has an in-order microarchitecture.

8. The apparatus of claim 6, wherein the memory fetch device is configured to selectively fetch the stored data from the first set of addresses, and wherein the memory fetch device is further configured to ignore the second set of addresses associated with the generated data.

9. The apparatus of claim 8, wherein the stored data comprises one or more redundant memory words, wherein the memory fetch device comprises a circular buffer configured to store the redundant memory words, and wherein the stored data is selectively fetched based on the redundant memory words stored in the circular buffer.

10. The apparatus of claim 9, wherein the memory fetch device is configured to selectively fetch the redundant memory words of the stored data a single time from the memory device based on the first set of addresses.

11. The apparatus of claim 6, wherein the memory fetch device is further configured to provide the output data by formatting the stored data of the packed data according to the predefined data structure of the processor.

12. The apparatus of claim 11, wherein the memory fetch device is further configured to provide the output data by further decompressing the formatted stored data.

13. The apparatus of claim 5, wherein the processor has no single instruction, multiple data (SIMD) capabilities.

14. An apparatus for an artificial neural network (ANN) comprising:
a microcontroller, configured to be coupled to a memory device and configured to process a data stream, wherein the data stream is configured to match at least one of a predefined precision, predefined layout or predefined data structure;
a data streaming fetch device, coupled to the memory device and the microcontroller, configured to process packed data on the memory device and provide a continuous output stream to the microcontroller, wherein the packed data comprises stored packed data and generated packed data, wherein the generated packed data is present in the packed data based on a predefined packing format of the packed data, wherein the data streaming fetch device is configured to process the packed data sequentially, wherein the data streaming fetch device comprises:
an address generator component configured to generate a stream of addresses and sub-word data-item information of the packed data, wherein the sub-word data-item information includes sub-word item numbers and sub-word item positions of the stored packed data on the memory device and associated with the stream of addresses;
a data fetch component configured to selectively fetch the stored packed data and selectively suppress a fetch of the generated packed data from the memory device based on the stream of addresses and the sub-word data-item information; and
a data formatting component configured to provide the continuous output stream to the microcontroller.

15. The apparatus of claim 14, wherein the data formatting component is further configured to provide data formats matching the stored packed data and a data instruction set of the microcontroller.

16. The apparatus of claim 14, wherein the address generator component is configured to generate a suppression indicator for each address in the stream of addresses, wherein the stored packed data is fetched based on the suppression indicator, and wherein the suppression indicator identifies the generated packed data that is replaced by generated data according to the predefined data structure.

17. The apparatus of claim 14, wherein the stored packed data comprises data unaligned with byte addresses, wherein the data streaming fetch device is configured to process the data unaligned with byte addresses based at least in part on the sub-word item numbers and the sub-word item positions.

18. The apparatus of claim 14, wherein the microcontroller is configured to perform convolutions on the data stream and reprogram format information of the packed data on the memory device, wherein the data streaming fetch device is configured to switch from processing the packed data on the memory device with the predefined packing format to processing the packed data on the memory device with a second packing format within a single convolution performed by the microcontroller, wherein the predefined packing format is different from the second packing format.

19. The apparatus of claim 14, wherein a subset of addresses in the stream of addresses are associated with one or more repeated words, wherein the data fetch component comprises a ring-buffer cache that is configured to store the one or more repeated words such that the data fetch component imports the one or more repeated words a single time from the memory device, and wherein the stored packed data is fetched from the ring-buffer cache when already stored there.

20. The apparatus of claim 14, wherein the stored packed data comprises one or more redundant memory words, wherein the data streaming fetch device is configured to selectively fetch the one or more redundant memory words a single time from the memory device.

* * * * *